(12) United States Patent
Beaumont

(10) Patent No.: US 10,722,770 B1
(45) Date of Patent: Jul. 28, 2020

(54) PRECISION REAL-TIME LASER MEASUREMENT AND MARKING APPARATUS

(71) Applicant: Tom Beaumont, New York, NY (US)

(72) Inventor: Tom Beaumont, New York, NY (US)

( * ) Notice: Subject to any disclaimer, the term of this patent is extended or adjusted under 35 U.S.C. 154(b) by 0 days.

(21) Appl. No.: 16/510,866

(22) Filed: Jul. 12, 2019

Related U.S. Application Data

(60) Provisional application No. 62/696,902, filed on Jul. 12, 2018.

(51) Int. Cl.
| | |
|---|---|
| *A63B 57/30* | (2015.01) |
| *G01C 3/00* | (2006.01) |
| *G01B 11/14* | (2006.01) |
| *B05B 9/08* | (2006.01) |
| *B05B 15/62* | (2018.01) |
| *B05B 12/00* | (2018.01) |
| *B05B 15/60* | (2018.01) |
| *G01C 15/02* | (2006.01) |

(52) U.S. Cl.
CPC .............. *A63B 57/30* (2015.10); *B05B 15/60* (2018.02); *G01B 11/14* (2013.01); *G01C 3/00* (2013.01); *A63B 2220/13* (2013.01); *B05B 9/08* (2013.01); *B05B 9/0805* (2013.01); *B05B 12/004* (2013.01); *B05B 15/62* (2018.02); *G01C 15/02* (2013.01)

(58) Field of Classification Search
CPC ....... B05B 13/00; B05B 15/60; E01C 23/166; G05B 2219/37129; G05B 2219/45013; A63B 57/203; A63B 57/353; A63B 57/30; G01B 11/14
USPC ......................................................... 473/406
See application file for complete search history.

(56) References Cited

U.S. PATENT DOCUMENTS 3,254,803 A * 6/1966 Meshberg ............ B65D 83/386
222/182
3,985,356 A 10/1976 Carlock
(Continued)

FOREIGN PATENT DOCUMENTS

| EP | 0470181 B1 | 2/1992 |
| WO | 2020014694 A1 | 2/2020 |

OTHER PUBLICATIONS

International Search Report and Written Opinion dated Nov. 25, 2019 cited in Application No. PCT/US19/41736, 13 pgs.

*Primary Examiner* — Karl Kurple
(74) *Attorney, Agent, or Firm* — Bekiares Eliezer LLP

(57) ABSTRACT

A precision real-time laser measurement and marking apparatus is provided. the disclosure also relates to the multiple components of the precision real-time laser measurement and marking apparatus in accordance with an embodiment of the present disclosure. The multiple components of precision real-time laser measurement and marking apparatus are as follows: the main housing; the foam spray can; the universal clip; and the fully assembled precision real-time laser measurement and marking apparatus. A method of using a precision real-time laser measurement and marking apparatus is provided. The method comprising pressing a distance measurement button while aiming an apparatus at a target; displaying an exact distance measurement on a LED screen wherein the exact distance measurement is the distance between the target and the apparatus; determining the exact distance measurement matches a desired distance; and marking a distance boundary using a spray nozzle of the apparatus.

18 Claims, 18 Drawing Sheets

(56) References Cited

U.S. PATENT DOCUMENTS

| | | | |
|---|---|---|---|
| 5,186,119 A | 2/1993 | Hlavin | |
| 5,868,840 A | 2/1999 | Klein, II et al. | |
| 5,918,565 A * | 7/1999 | Casas | G01C 15/02 |
| | | | 116/209 |
| 6,227,989 B1 | 5/2001 | Reid | |
| 6,294,022 B1 * | 9/2001 | Eslambolchi | B65D 83/203 |
| | | | 118/315 |
| 6,976,928 B2 | 12/2005 | Hemphill | |
| 7,798,922 B2 | 9/2010 | Oresky | |
| 8,070,630 B2 | 12/2011 | Minarovic | |
| 8,556,122 B2 * | 10/2013 | Helf | A61L 9/14 |
| | | | 222/162 |
| 8,590,743 B2 * | 11/2013 | Beland | G01C 15/02 |
| | | | 427/137 |
| 8,713,808 B2 | 5/2014 | Amron | |
| 9,046,413 B2 * | 6/2015 | Nielsen | B65D 83/203 |
| | | | 702/130 |
| 9,144,729 B2 | 9/2015 | Foster | |
| 9,433,849 B1 | 9/2016 | Brown | |
| 2002/0165046 A1 * | 11/2002 | Helber | A63B 71/06 |
| | | | 473/406 |
| 2005/0137829 A1 * | 6/2005 | Gimelfarb | G01B 11/0683 |
| | | | 702/171 |
| 2006/0023199 A1 * | 2/2006 | Stierle | G01C 3/08 |
| | | | 356/4.01 |
| 2007/0032317 A1 | 2/2007 | Frederick | |
| 2010/0006667 A1 * | 1/2010 | Nielsen | A63C 19/065 |
| | | | 239/74 |
| 2010/0096477 A1 | 4/2010 | Klein, II et al. | |
| 2010/0133261 A1 * | 6/2010 | Schildt | H05B 6/105 |
| | | | 219/635 |
| 2010/0137077 A1 * | 6/2010 | Petela | A63B 57/353 |
| | | | 473/406 |
| 2011/0045175 A1 * | 2/2011 | Nielsen | G01C 15/02 |
| | | | 427/137 |
| 2011/0117272 A1 * | 5/2011 | Nielsen | G01S 5/0284 |
| | | | 427/137 |
| 2011/0191058 A1 * | 8/2011 | Nielsen | B65D 83/203 |
| | | | 702/130 |
| 2013/0122186 A1 * | 5/2013 | Hoppel | A61L 9/14 |
| | | | 222/162 |
| 2013/0229641 A1 | 9/2013 | Wolst et al. | |
| 2013/0276205 A1 * | 10/2013 | Madore | A43B 3/0078 |
| | | | 2/160 |
| 2015/0182825 A1 * | 7/2015 | O'Connor | A63B 24/0021 |
| | | | 473/406 |
| 2017/0057081 A1 * | 3/2017 | Krohne | B25J 9/0084 |
| 2017/0252760 A1 | 9/2017 | Campbell | |
| 2017/0334189 A1 * | 11/2017 | Nam | G01S 5/0284 |
| | | | 427/137 |
| 2019/0145798 A1 * | 5/2019 | Kamiya | G01D 5/2405 |
| | | | 700/258 |

* cited by examiner

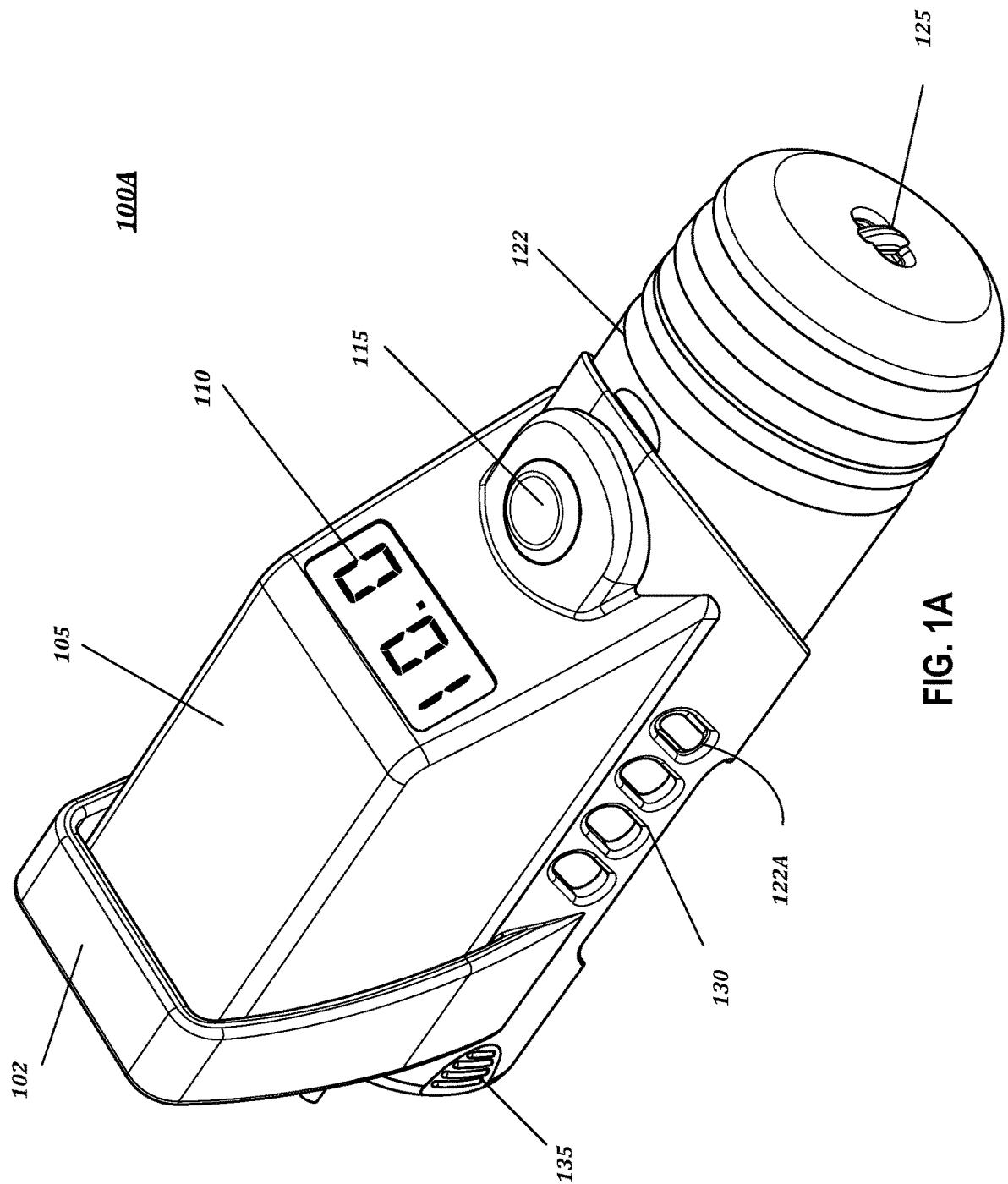

PRECISION REAL-TIME LASER MEASUREMENT AND MARKING APPARATUS

RELATED APPLICATION(S)

Under provisions of 35 U.S.C. § 119(e), Applicant claims the benefit of U.S. provisional application No. 62/696,902, entitled "PRECISION REAL-TIME LASER MEASUREMENT AND MARKING APPARATUS," filed Jul. 12, 2018, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to measuring arrangements, position detection, or surveying characterized by the use of optical means. Moreover, the present disclosure relates to a spraying apparatus for discharge of liquids or dispensing contents configured for marking a surface. The present disclosure may be related to at least the Cooperative Patent Classifications G01B11/00, G01B9/00, G01C15/00, B21B38/00, B21B37/00, G01N27/00, G01N21/00, B05B7/00, C09D5/00.

BACKGROUND OF THE DISCLOSURE

The sports industry is a very lucrative business internationally. The sports market in North America was worth $60.5 billion in 2014. It is expected to reach $73.4 billion by 2019. One of the biggest reasons for growth is the projected revenue increases derived from media rights deals in conjunction with gate revenues. Over $3.2 billion was wagered in sports bets in Las Vegas casinos in 2011 with $1.34 billion wagered on American football. The Premier League (English/Welsh football league, i.e. soccer) is a $5.3 billion business. The National Football League (American Style Football) is a $13 billion business. The World Cup is predicted to have a total economic impact of $30.8 billion by 2023.

With sporting fans, players, sporting clubs, companies, and sponsors investing such tremendous funds, time and resources in the global sports industry, there is an expectation that the quality of the sporting product to have the highest level of integrity. One manner to ensure this is to make sure that the officiating be precise and completely fair in sporting contests. Corruption has always been a factor when dealing with professional sports from the American Baseball Black Sox Scandal, to fixed Cricket matches, to basketball point shaving scandals, to most prominently in Association Football match fixing. Despite this, there remains a high commitment from league officials to maintain the highest standard of integrity with sports.

However, recently, there have been a surge of international scandals and allegations regarding match fixing, referee corruption, illegal sports gambling, and player collusion relating to professional sports. For example, FIFA independent ethics committee has been probing numerous cases of suspected corruption while serving lifetime bans from the sport of football (soccer) for corrupt officials found guilty. American football quarterback, Tom Brady, was suspended by the League for four games in 2016, for instructing staff to deflate his footballs below the required level so that he would have an illegal advantage over his opponent. Incidents like this are unacceptable in the world of sports.

In addition to avoiding this type of corruption, it is also preferable to provide methods and systems to avoid unintentionally providing an advantage for one opponent over another opponent by imprecise officiating. One manner of maintaining a high level of sports integrity, it is necessary to regulate sports officiating. What is necessary is tools to provide an improved means and methods for more accurate officiating in professional sports.

In some sporting situations, it may be necessary to quickly determine precise measurements. For example, a game official may need to determine the proper yardage after a play, measure the distance of a game ball, player, or game object from a particular location on the field of play. The official may further need to mark the location on the field. Thus, the conventional strategy is to have game officials quickly approximate this distance so that game play may continue. This often causes problems because the conventional strategy does not provide for precise or accurate real-time measurement. For example, imprecise measurement may unfairly advantage one team over another team.

Accordingly, there remains a need for improved means and methods for precision real-time measurement. This need and other needs are satisfied by the various aspects of the present disclosure.

SUMMARY OF THE DISCLOSURE

In accordance with the purposes of the disclosure, as embodied and broadly described herein, the disclosure, in one aspect, relates to precision real-time laser measurement and marking apparatus, such as, for example providing a precision distance measuring tool. In further aspects, a precision real-time laser measurement and marking apparatus is provided. In another aspect, the disclosure relates to the precision real-time laser measurement and marking apparatus. The precision real-time laser measurement and marking apparatus solves the problem that is caused by the failure of officials to accurately measure distances during sporting contests. For example, during football (soccer) matches, officials rarely accurately measure the ten-yard distance between a soccer ball and the defensive line for placement of a free kick. This disclosure provides a precision measurement tool to overcome these shortcomings.

In further aspects, the disclosure also relates to the multiple components of the precision real-time laser measurement and marking apparatus in accordance with an embodiment of the present disclosure. The multiple components of precision real-time laser measurement and marking apparatus are as follows: the main housing; the foam spray can; the universal clip; and the fully assembled precision real-time laser measurement and marking apparatus.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

FIGS. 1A, 1B, 1C, and 1D show perspective and isometric views of the precision real-time laser measurement and marking apparatus in accordance with an embodiment of the present disclosure.

DETAILED DESCRIPTION OF THE DISCLOSURE

Figure 1B:
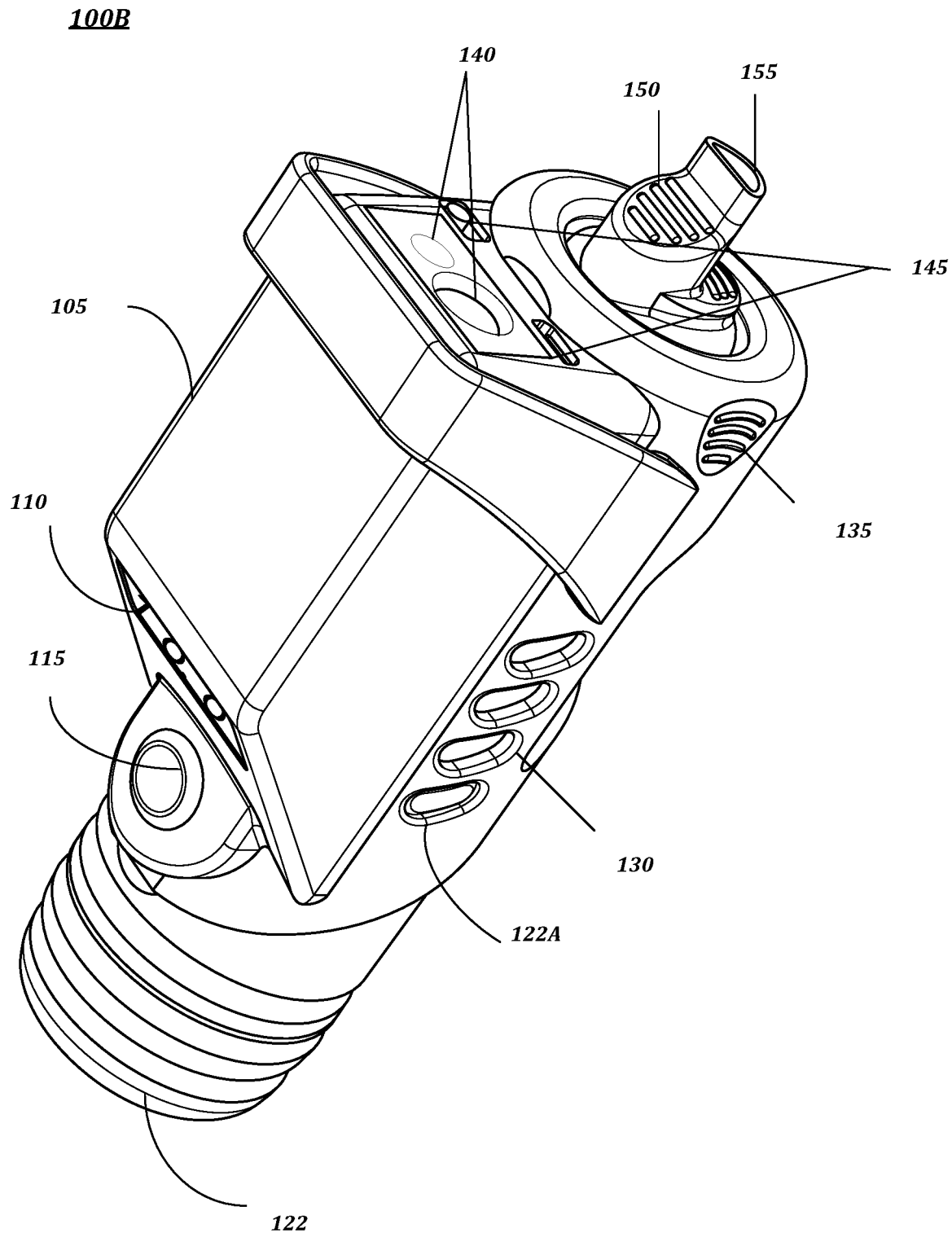

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Precision Real-Time Laser Measurement and Marking Apparatus Devices and Systems

As briefly described above, the present disclosure relates, in various aspects, to a precision real-time laser measurement and marking apparatus. In one aspect, the present disclosure provides a precision real-time laser measurement and marking apparatus to both measure and mark the distance between a soccer game ball and defensive line during a free kick placement by an official. In further aspects, the precision real-time laser measurement and marking apparatus is provided for both measuring and marking the precise distance between a game ball and a defender by an official. In still further aspects, the precision real-time laser measurement and marking apparatus is configured to measure a distance of ten yards between a game ball and a defensive line. In even further aspects, the precision real-time laser measurement and marking apparatus is configured to mark a distance of ten yards between a game ball and a defensive line.

In further aspects, the disclosed the precision real-time laser measurement and marking apparatus is configured to mark a distance by using a spray can wherein the spray can maybe at least one of but not limited to an aerosol can, a foam spray can, and the like. In still further aspects, the device can be useful for both measuring and marking precise distance.

In another aspect, the present disclosure provides an apparatus.

An apparatus comprising: an optical measuring means including but not limited to a laser measuring means; a housing including but not limited to a vinyl, plastic, metal, or other housing wherein said housing may be produced by injection molding, three-dimensional printing, and other manufacturing means; a marking component including but not limited to a vanishing spray, a spray paint, a chemical marking substance, a scented marking substance, an unscented marking substance; and a fastener including but not limited to a handle, a grip, a clip, a hook and look fastener, and a fastening means.

The apparatus further comprising wherein the optical measuring means further comprises a precision real-time laser measuring apparatus.

The apparatus further comprising wherein the housing further comprises a main housing constructed from at least one of: plastic, metal, foam, and other like material.

The apparatus further comprising wherein the fastener further comprises a universal clip.

The apparatus further comprising wherein the marking component further comprises a spray can.

The apparatus further comprising wherein the spray can further comprises at least one of: a vanishing spray, a vanishing paint, a spray paint, an odorless paint, and a like material.

In another aspect, the present disclosure provides a system for precision real-time laser measurement and marking.

A system comprising:
a real-time optical measuring apparatus;
a housing apparatus;
a marking apparatus; and
a fastener.

In another aspect, the present disclosure provides a fastener wherein the fastener may be at least one of a universal clip that fastens to a belt; a snapping mechanism, a locking mechanism, and other suitable fastening tools.

In further aspects, the present disclosure provides an optical measuring means further comprises a real-time optical measuring apparatus. In yet another aspect, the optical measuring means comprises laser range finder optics.

In various aspects, the present disclosure provides a marking component or marking apparatus wherein the marking component or marking apparatus further comprises a spray can or foam spray can may comprise at least one of: a fluorescent marking spray, a spray paint and a vanishing spray product.

In further aspects, the present disclosure provides a housing wherein the housing further comprises at least one of a range reading button, a mini USB charge port, a spray foam nozzle, squeeze points for can release, and laser range finder optics.

In still further aspects, the disclosed precision real-time laser measurement and marking apparatus may further comprise a small lightweight canister with an attachment strap for comfortable portability around a waist. In still further aspects, the disclosed precision real-time laser measurement and marking apparatus may be configured such that the canister mold is uniquely configured in a custom biomechanical design such that it fits ergonomically around the hand allowing for superior grip. In still further aspects, the disclosed precision real-time laser measurement and marking apparatus may be configured such that the canister further comprises a slip free bond applicator especially in wet weather. In still further aspects, the disclosed precision real-time laser measurement and marking apparatus may be configured for a left-hand and right-hand design.

In further aspects, the disclosed precision real-time laser measurement and marking apparatus may further comprise GPS and other chip technologies are also embedded in the apparatus. In still further aspects, the disclosed precision real-time laser measurement and marking apparatus may be configured to record product usage and other metrics is available via USB to an IBLC™ software platform. The software platform may be configured such that referees will be able to upload analytical data recorded during a game to IBLC software and various third-party organizations and referee associations. The information gathered on every usage will be used in a long-term study.

In further aspects, the disclosed precision real-time laser measurement and marking apparatus devices and systems can be used for a variety of purposes. For example, the precision real-time laser measurement and marking apparatus may be useful for in a variety of industries including but not limited to sporting events, sports contests, construction, scientific research, transportation, utility services, and the like.

According to various further aspects of the disclosure, the precision real-time laser measurement and marking apparatus devices and systems can comprise multiple configurations. In aspects, FIGS. 1-12 show various views and features of a device for both measuring and marking distances. For example, the precision real-time laser measurement and marking apparatus may be configured for both measuring and marking distances between a soccer game ball and defensive line during a free kick placement by an official in accordance with the present disclosure.

In these embodiments, the precision real-time laser measurement and marking apparatus device comprises components of the precision real-time laser measurement and marking apparatus including but not limited to: a precision real-time laser measuring component, a main housing; a foam spray can; a universal clip.

Figure 1C:
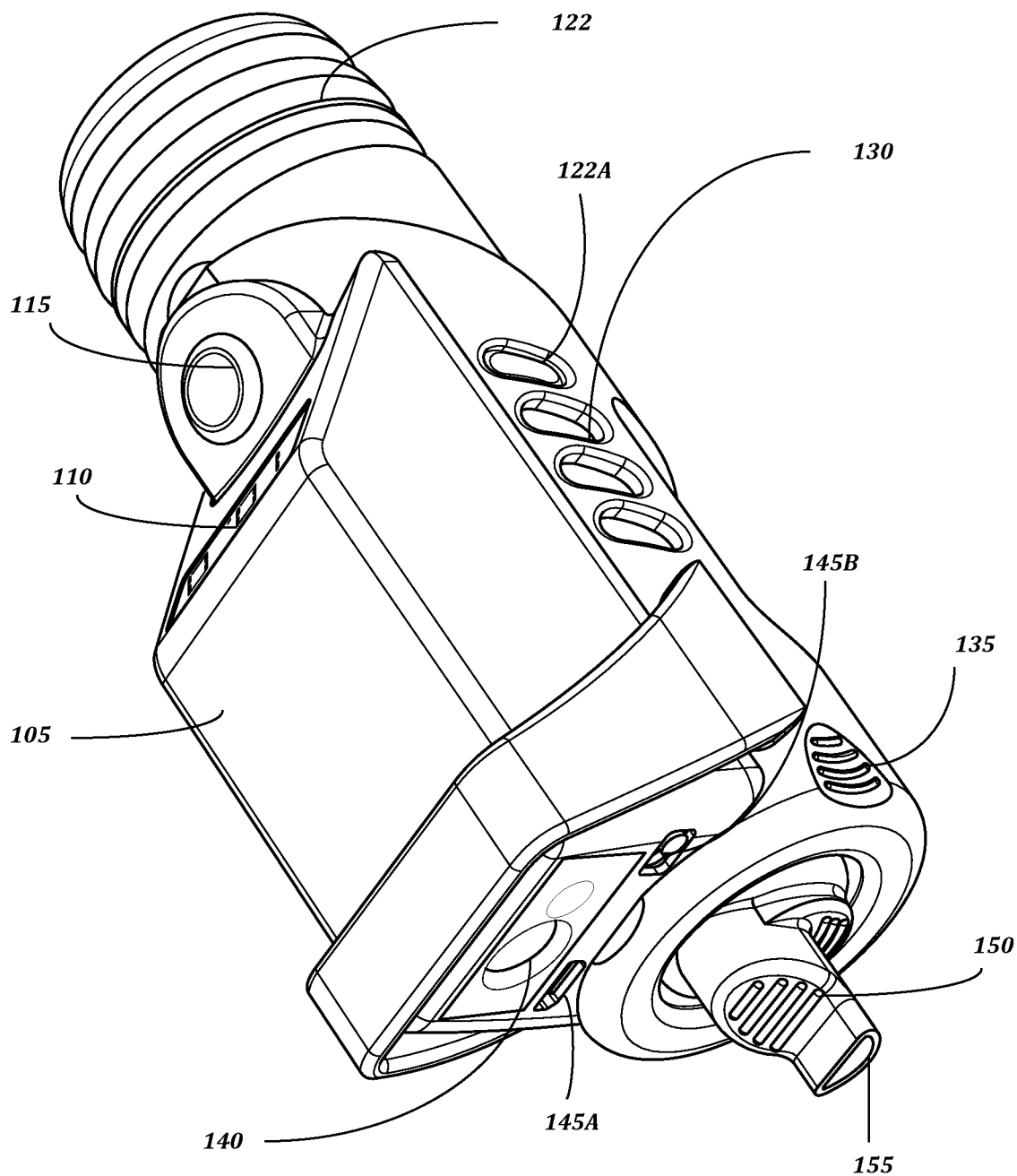
Figure 1D:
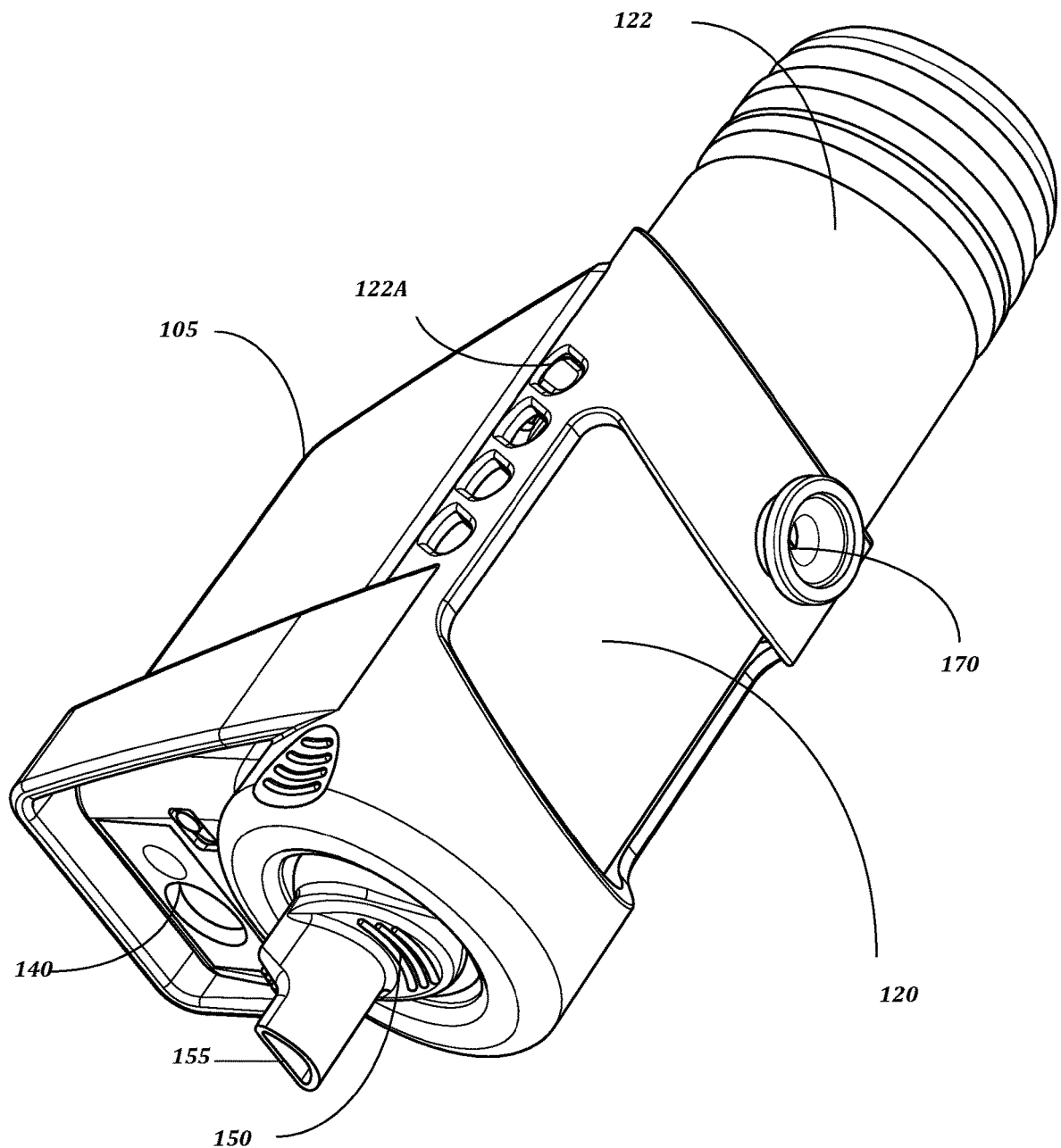

FIGS. 1A, 1B, 1C, and 1D show perspective and isometric views of the precision real-time laser measurement and marking apparatus in accordance with an embodiment of the present disclosure. More specifically, FIG. 1A, 100A shows a rear left perspective view of the precision real-time laser measurement and marking apparatus. FIG. 1B, 100B shows a top right perspective view of the precision real-time laser measurement and marking apparatus. FIG. 1C, 100C shows a reversed left perspective view of the precision real-time laser measurement and marking apparatus. FIG. 1D, 100D shows a bottom left perspective view of the precision real-time laser measurement and marking apparatus. FIG. 1A, 100A, FIG. 1B, 100B, FIG. 1C, 100C, and FIG. 1D, 100D show some of the multiple components of the full assembly precision real-time laser measurement and marking apparatus as follows: a main housing 105, a front housing guard 102, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165. Front housing guard 102 may be configured as an elevated member affixed to the main housing 105. In one or more embodiments, the front housing guard 102 may be used as a handle for the precision real-time laser measurement and marking apparatus 100A.

Figure 2:
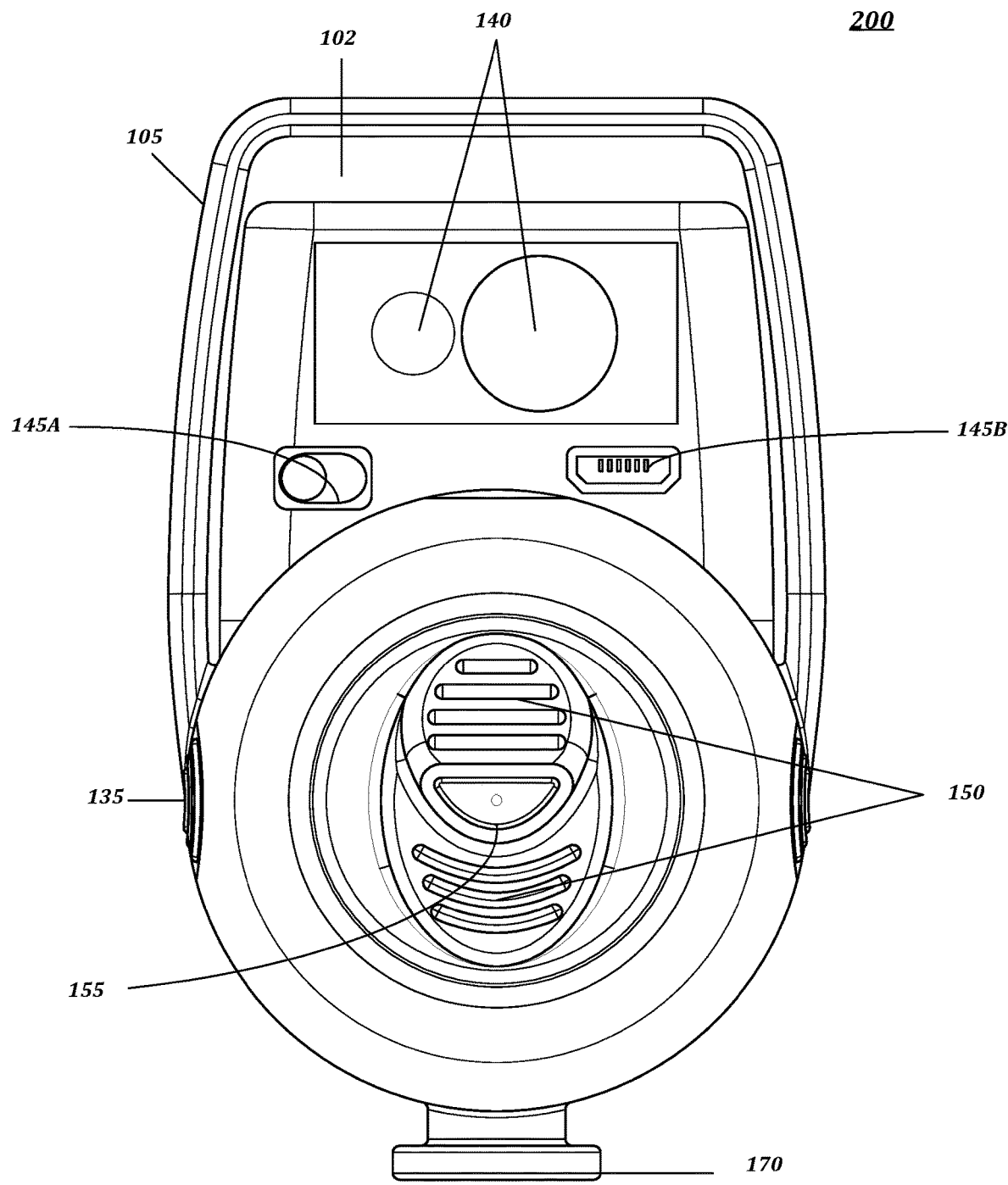
FIG. 2 shows a front view of the precision real-time laser measurement and marking apparatus in accordance with an embodiment of the present disclosure.

FIG. 2 shows a front view of the precision real-time laser measurement and marking apparatus in accordance with an embodiment of the present disclosure. More specifically, FIG. 2, 200 shows the front view of the precision real-time laser measurement and marking apparatus. FIG. 2, 200 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165. A clip assembly may slide over the clip mounting peg 170 and be attached to the precision real-time laser measurement and marking apparatus for attachment to garments, pockets, belt loops, bags, belt straps, and other clothing. The housing squeeze points 135 may be configured to provide comfortable, aesthetic, and ergonomic gripping posture at the ideal position for handheld use of the precision real-time laser measurement and marking apparatus. Housing squeeze points 135 may be configured to allow for ease of removal of the foam spray can 120. Housing squeeze points 135 may also be configured to allow for convenient replacement of the foam spray can 120 once the marking spray is completely used. The housing squeeze points 135 configured to allow the precision real-time laser measurement and marking apparatus 100A to be held in one hand of a user while the foam spray can 120 is removed and replaced with the opposite hand of a user. In one or more instances, one or more users may be involved in the replacement and or removal of various components of the precision real-time laser measurement and marking apparatus. FIG. 2, 200 shows the precision real-time laser measurement and marking apparatus having a power switch 145A and a USB port 145B wherein the USB port 145B may be configured as a mini USB, micro USB, nano USB or standard USB female port. The USB port 145B may provide for charging power for the precision real-time laser measurement and marking apparatus 100A. The USB port 145B may provide for connectivity to a computing device for transferring data from the precision real-time laser measurement and marking apparatus 100A to a computing device. The power switch 145A and USB port 145B may be positioned at other placements on the main housing 105, front housing guard 102, bottom surface of main housing 165, or other placements of the precision real-time laser measurement and marking apparatus.

In one or more embodiments, clip mounting peg 170 may attach to a clip assembly. The clip assembly of precision real-time laser measurement and marking apparatus may comprise a base portion of the clip assembly having a curved top portion and a curved bottom portion with a length wherein the curved portions are semicircular curves having a lesser radius than the length. A forward-facing portion of the clip assembly may comprise a rectangular top portion with rounded edged and a curved bottom portion with a semicircular curve having a similar radius.

Figure 3:
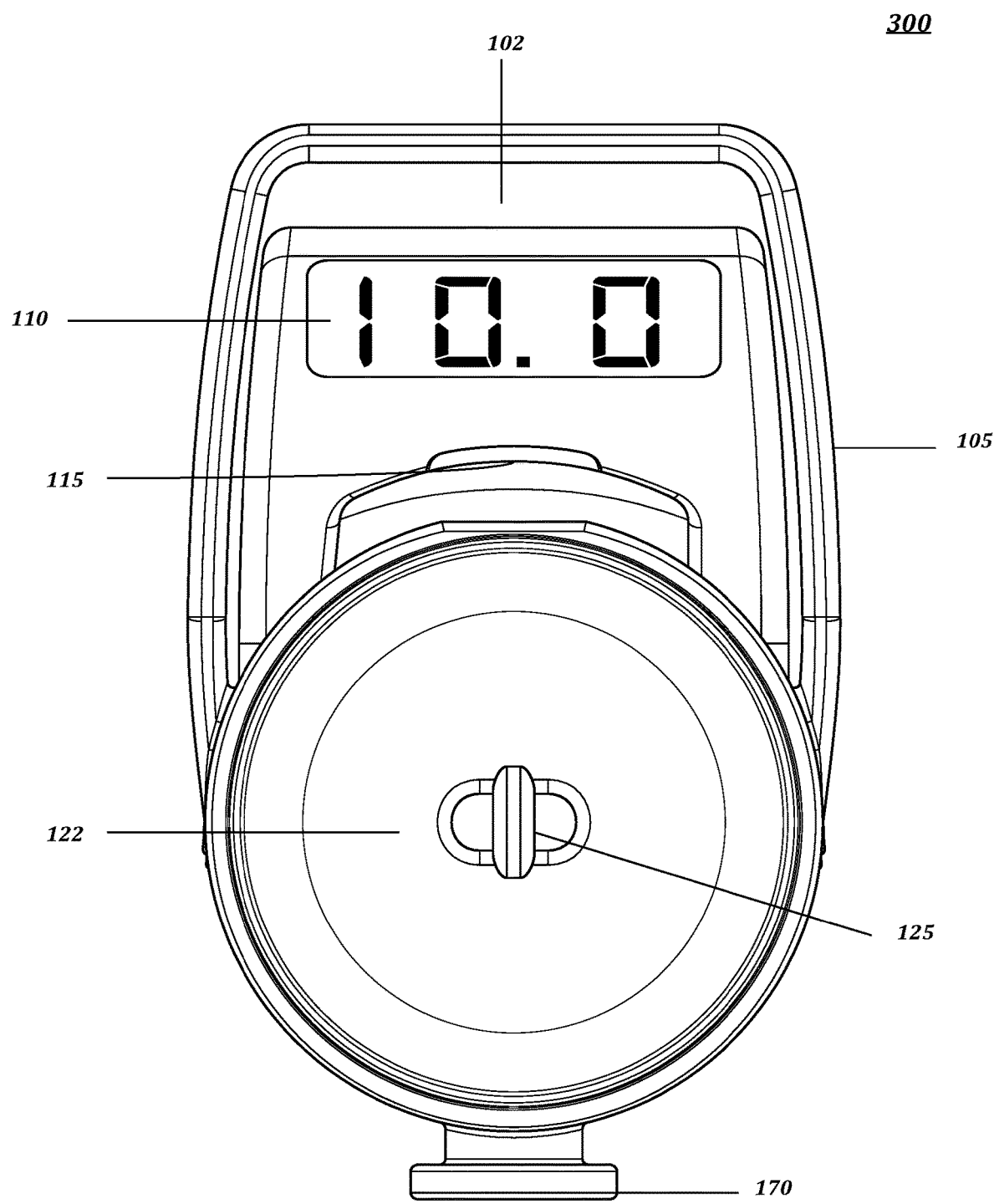
FIG. 3 shows a rear view of the precision real-time laser measurement and marking apparatus in accordance with an embodiment of the present disclosure.

FIG. 3 shows a rear view of the precision real-time laser measurement and marking apparatus in accordance with an embodiment of the present disclosure. More specifically, FIG. 3, 300 shows the back view of the precision real-time laser measurement and marking apparatus. FIG. 3, 300 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165. Spray can bracket 125 may be configured as a fastening means having an aperture configured to allow for attachment of a string, a key chain, a necklace, cord, or corded member via the fastening means. This spray can bracket 125 may be adapted to allow for convenient carrying of the precision real-time laser measurement and marking apparatus or the foam spray can 120. FIG. 3, 300 also shows the display 110 which may include but not be limited to a LED segmented display configured to display the laser measured distance between the point of focus on the playing field (i.e. player, game ball, marker, or other object) and the precision real-time laser measurement and marking apparatus 100A. The display 110 may be configured to one or more sizes that fit the main housing 105 of the precision real-time laser measurement and marking apparatus 100A. Display sizes may include but are not limited to a 5×7 LED segmented display or a larger or smaller display adapted to fit the main housing 105.

Figure 4:
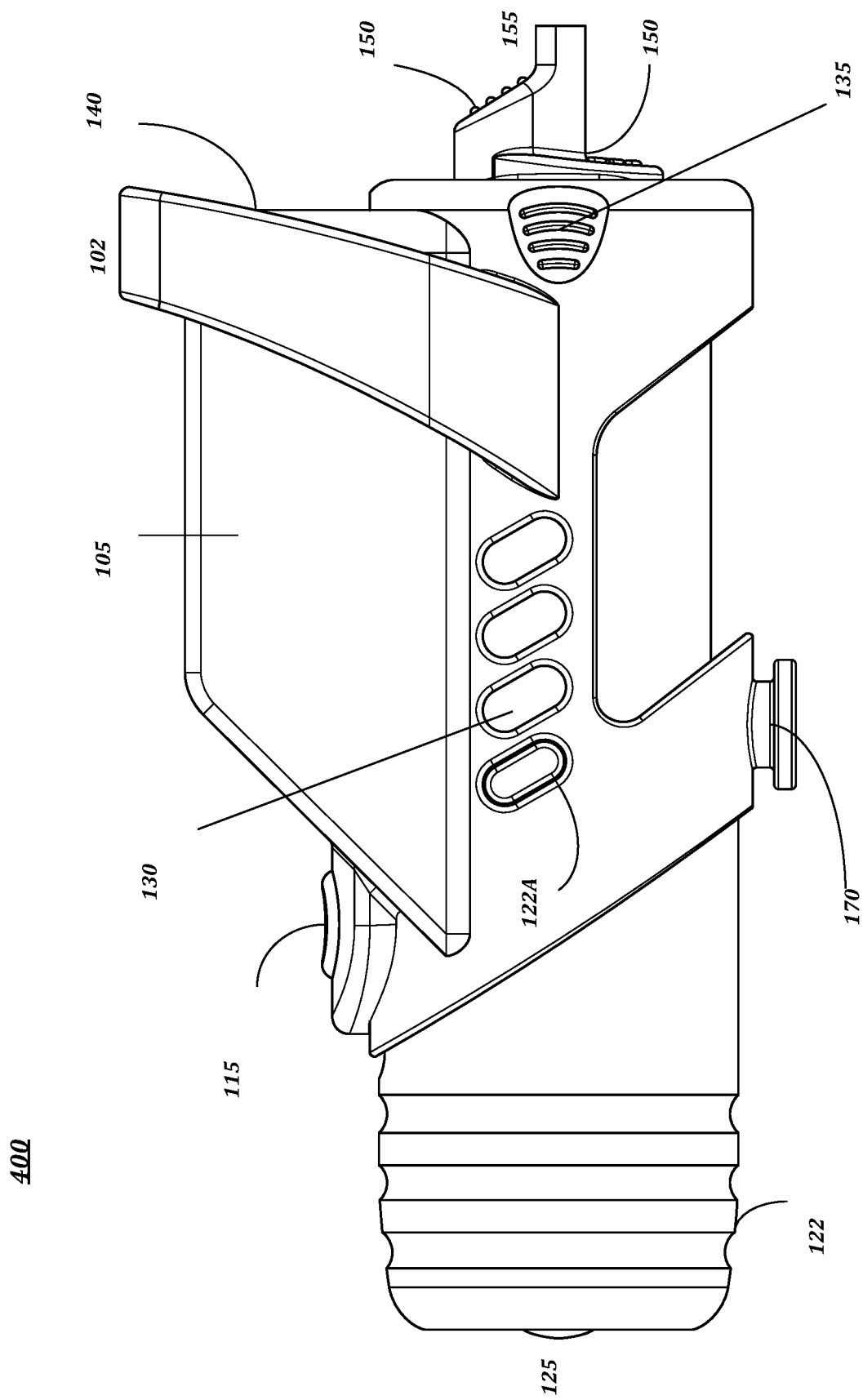
FIG. 4 shows a side view of the precision real-time laser measurement and marking apparatus in accordance with an embodiment of the present disclosure.

FIG. 4 shows a side view of the precision real-time laser measurement and marking apparatus in accordance with an embodiment of the present disclosure. More specifically, FIG. 4, 400 shows a right-side view of the precision real-time laser measurement and marking apparatus in accordance with an embodiment of the present disclosure. FIG. 4, 400 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 5:
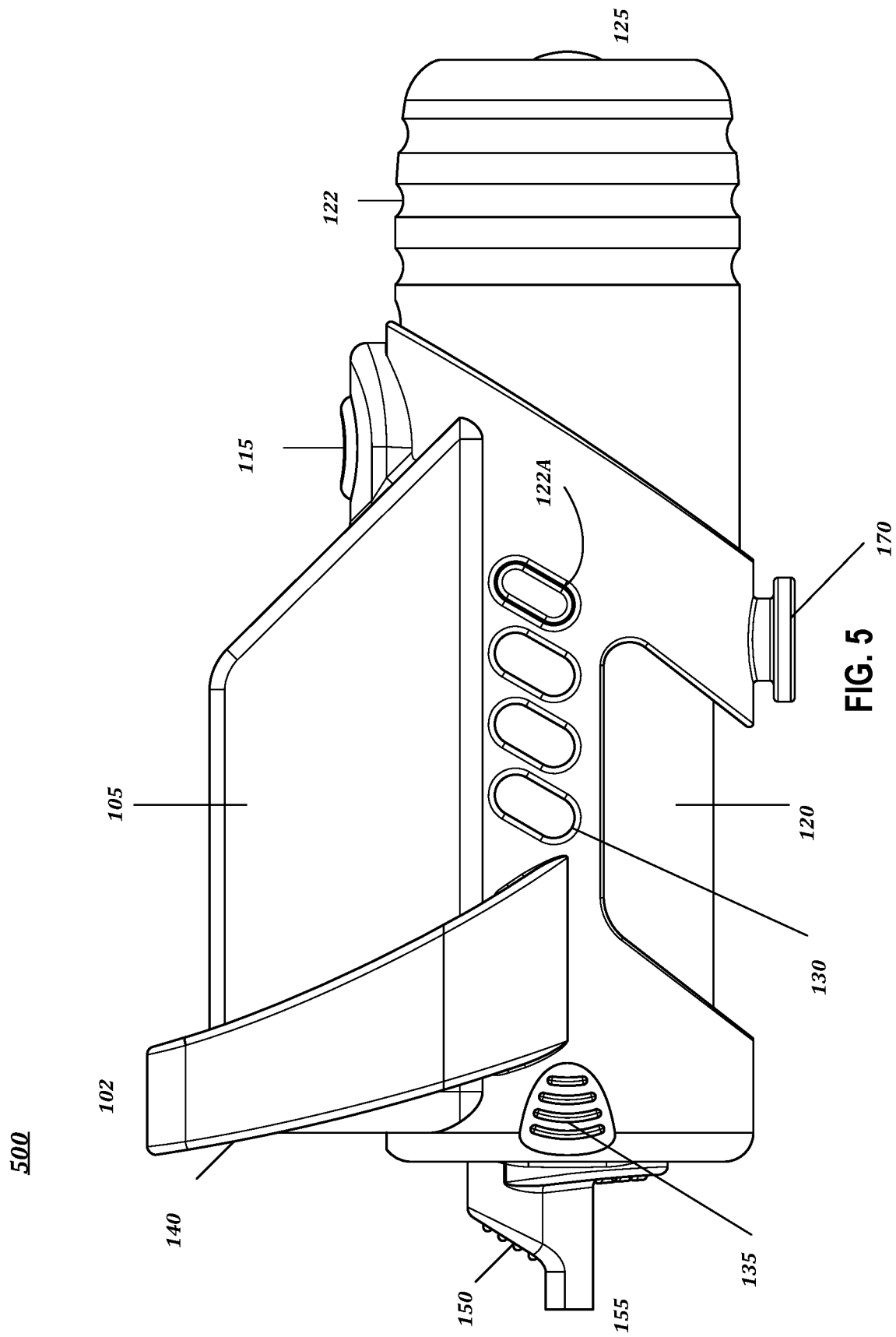
FIG. 5 shows another side view of the precision real-time laser measurement and marking apparatus in accordance with an embodiment of the present disclosure.

FIG. 5 shows another side view of the precision real-time laser measurement and marking apparatus in accordance with an embodiment of the present disclosure. More specifically, FIG. 5, 500 shows the left side view of the precision real-time laser measurement and marking apparatus. FIG. 5, 500 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 6:
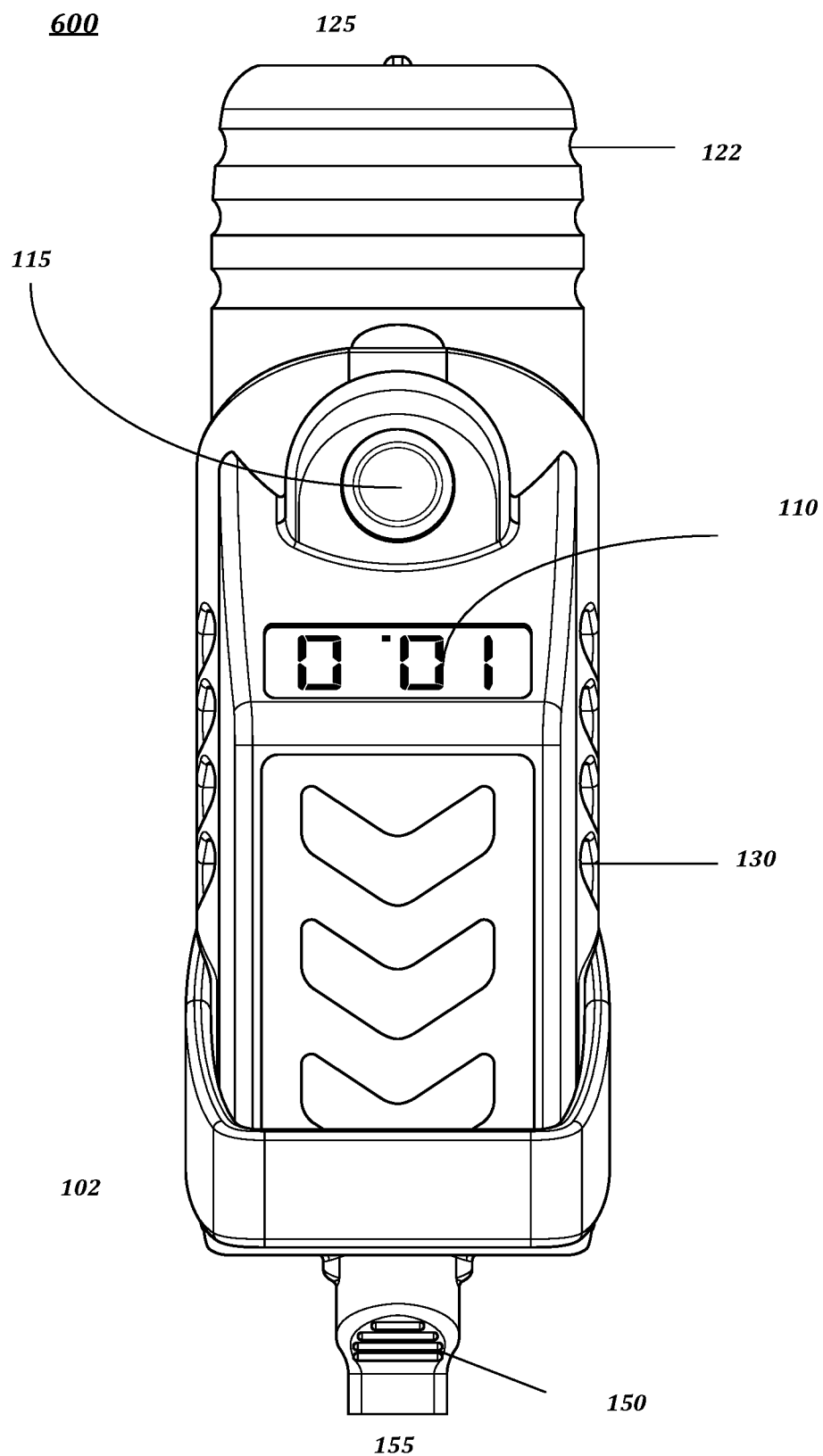
FIG. 6 shows a top view of the precision real-time laser measurement and marking apparatus in accordance with an embodiment of the present disclosure.

FIG. 6 shows a top view of the precision real-time laser measurement and marking apparatus in accordance with an embodiment of the present disclosure. More specifically, FIG. 6, 600 shows the reversed top view of the precision real-time laser measurement and marking apparatus. FIG. 6, 600 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 7:
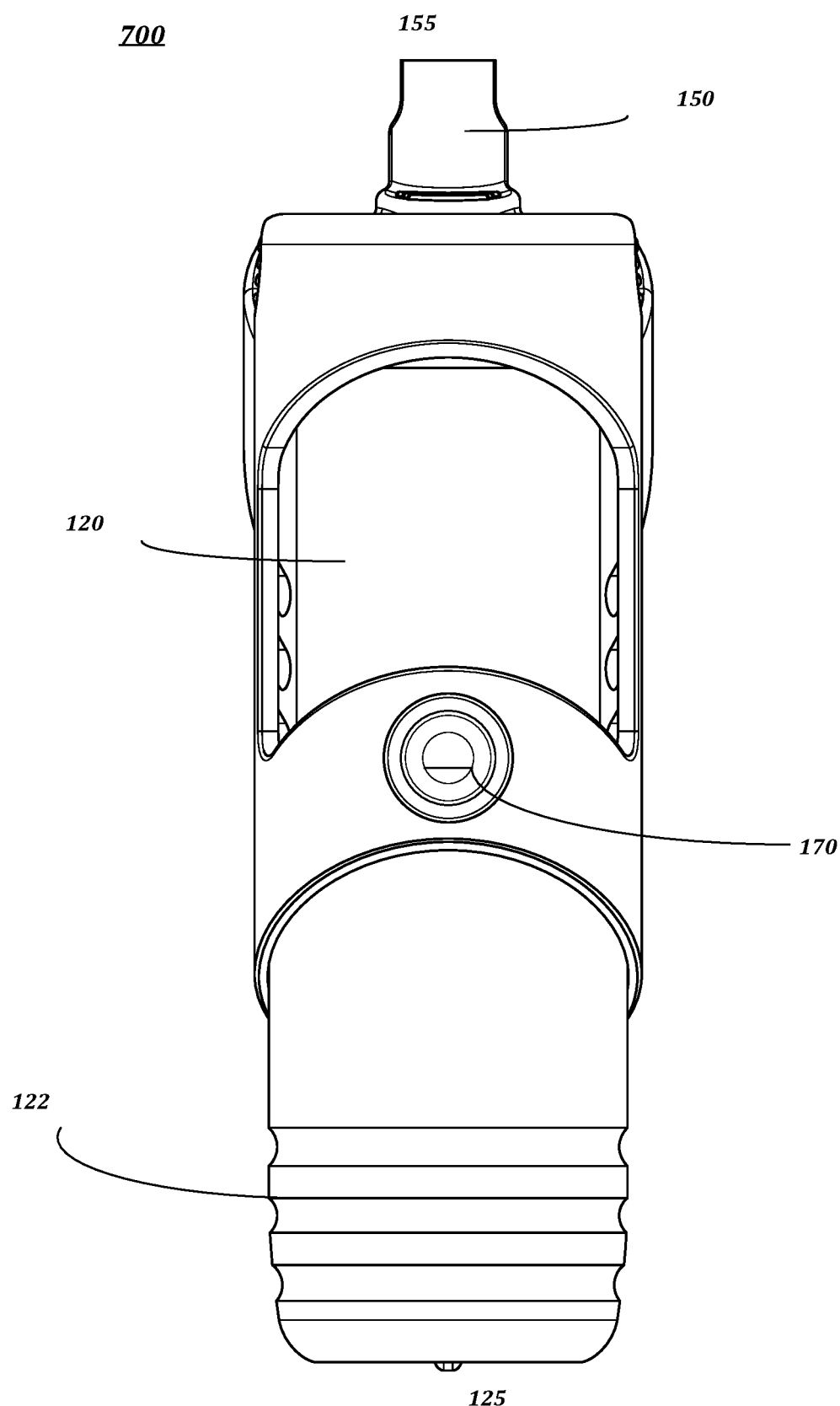
FIG. 7 shows a bottom view of the precision real-time laser measurement and marking apparatus in accordance with an embodiment of the present disclosure.

FIG. 7, 700 shows a bottom view of the precision real-time laser measurement and marking apparatus in accordance with an embodiment of the present disclosure. FIG. 7, 700 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 8:
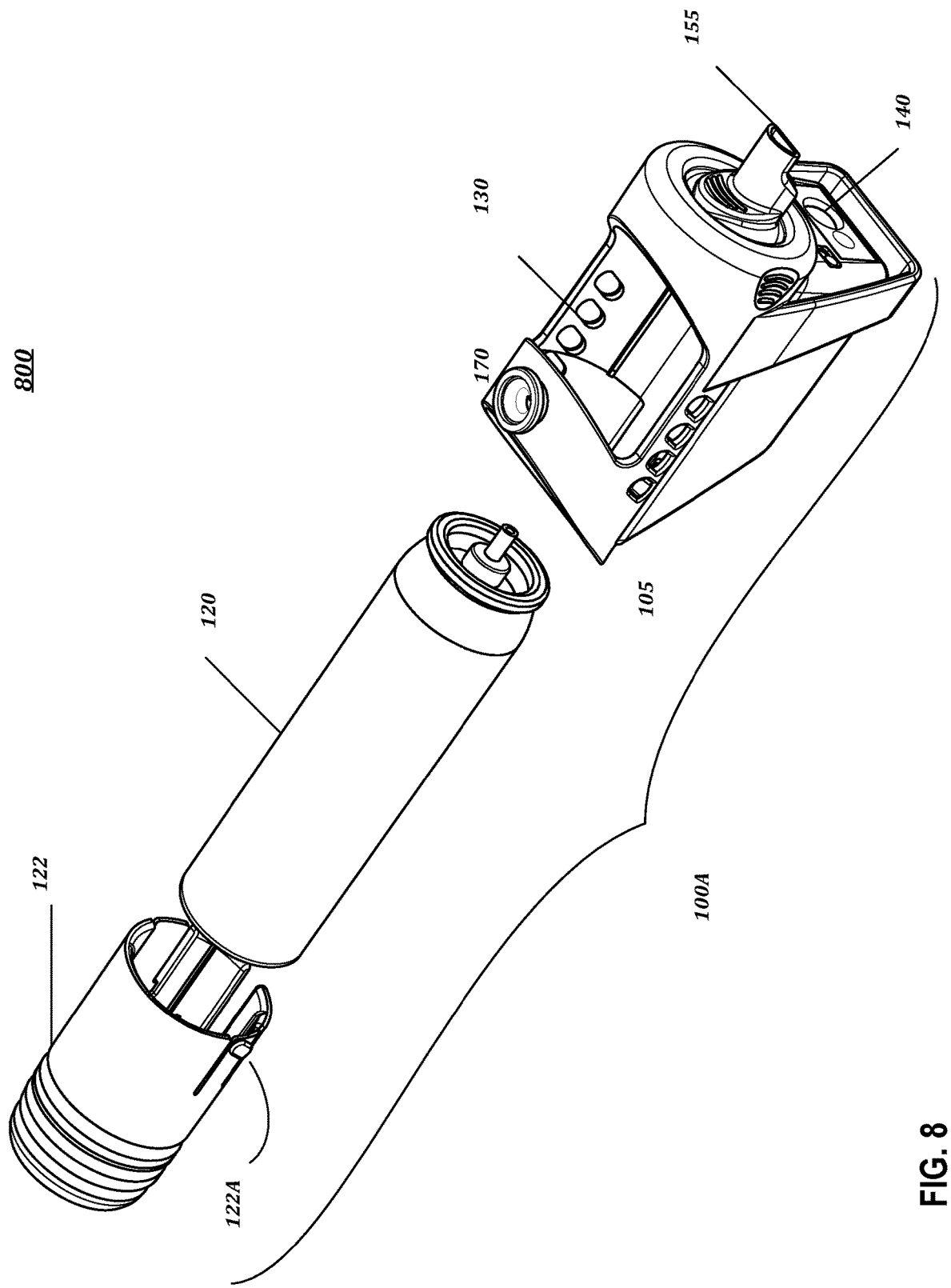
FIG. 8 shows an exploded view of the full assembly of the precision real-time laser measurement and marking apparatus in accordance with an embodiment of the present disclosure.

FIG. 8 shows an exploded view of the full assembly of the precision real-time laser measurement and marking apparatus in accordance with an embodiment of the present disclosure. More specifically, FIG. 8, 800 shows a bottom exploded view of the precision real-time laser measurement and marking apparatus 100A which shows the underside of the precision real-time laser measurement and marking apparatus 100A. FIG. 8, 800 shows a can cover 122 configured to cover a base of the foam spray can 120. FIG. 8, 800 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 9:
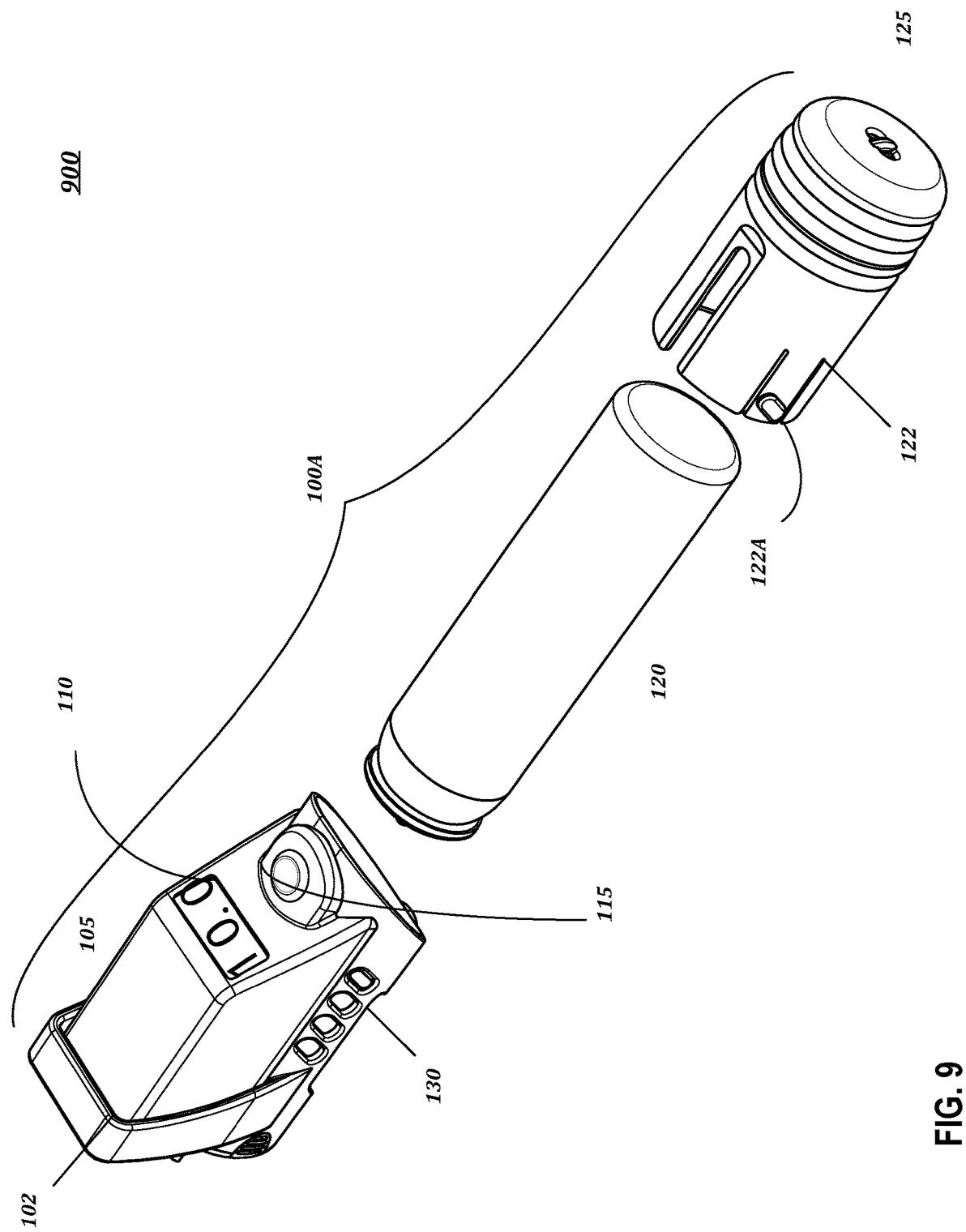
FIG. 9 shows an exploded view of the full assembly of the precision real-time laser measurement and marking apparatus in accordance with an embodiment of the present disclosure.

FIG. 9 shows an exploded view of the full assembly of the precision real-time laser measurement and marking apparatus in accordance with an embodiment of the present disclosure. More specifically, FIG. 9, 900 shows a top rear exploded view of the precision real-time laser measurement and marking apparatus 100A which shows the top side of the precision real-time laser measurement and marking apparatus 100A. FIG. 9, 900 shows a can cover 122 configured to cover a base of the foam spray can 120. FIG. 9, 900 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 10:
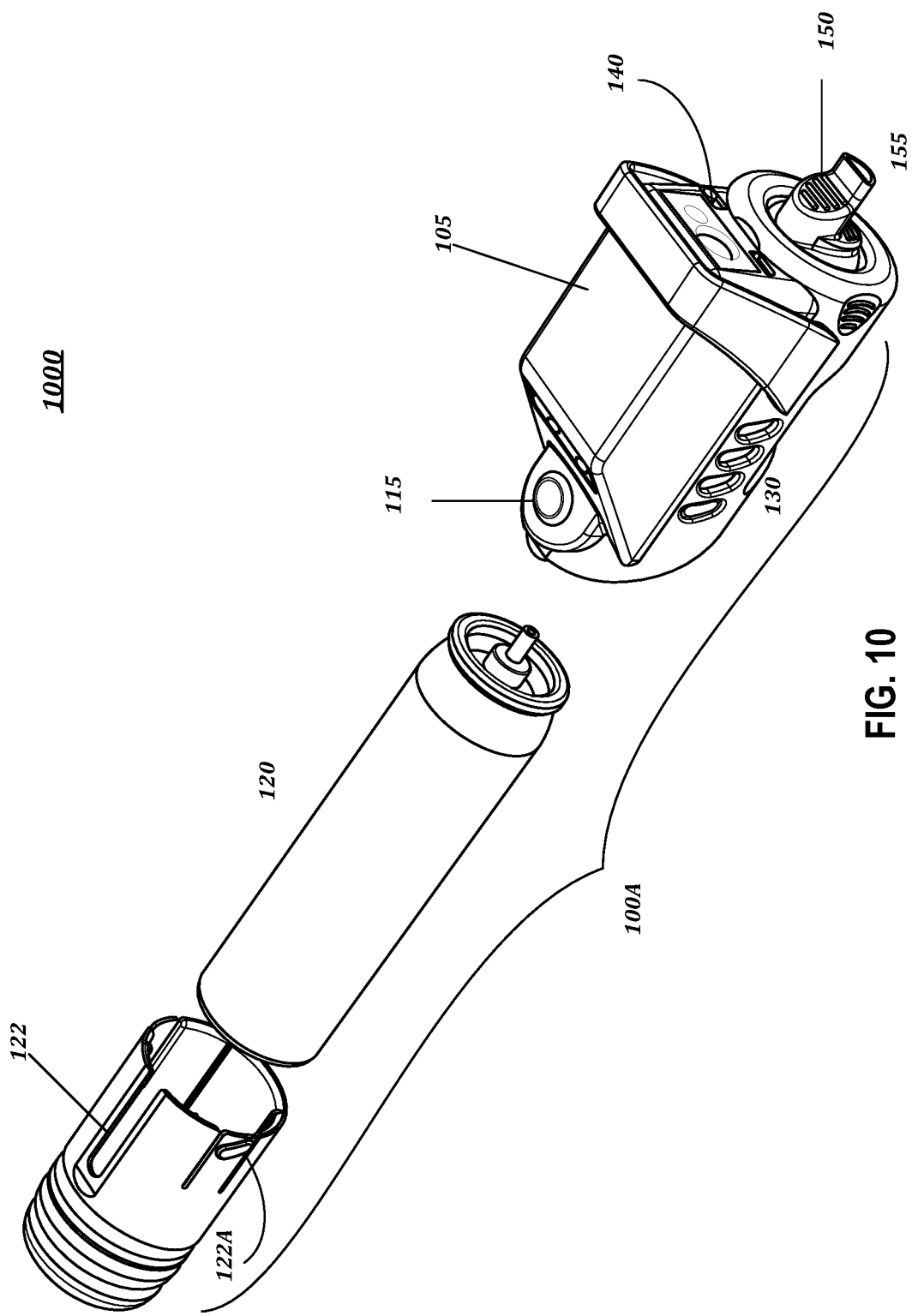
FIG. 10 shows an exploded view of the full assembly of the precision real-time laser measurement and marking apparatus in accordance with an embodiment of the present disclosure.

FIG. 10 shows an exploded view of the full assembly of the precision real-time laser measurement and marking apparatus in accordance with an embodiment of the present disclosure. More specifically, FIG. 10, 1000 shows a top front exploded view of the precision real-time laser measurement and marking apparatus 100A which shows the top side of the precision real-time laser measurement and marking apparatus 100A. FIG. 10, 1000 shows a can cover 122 configured to cover a base of the foam spray can 120. FIG. 10, 1000 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 11:
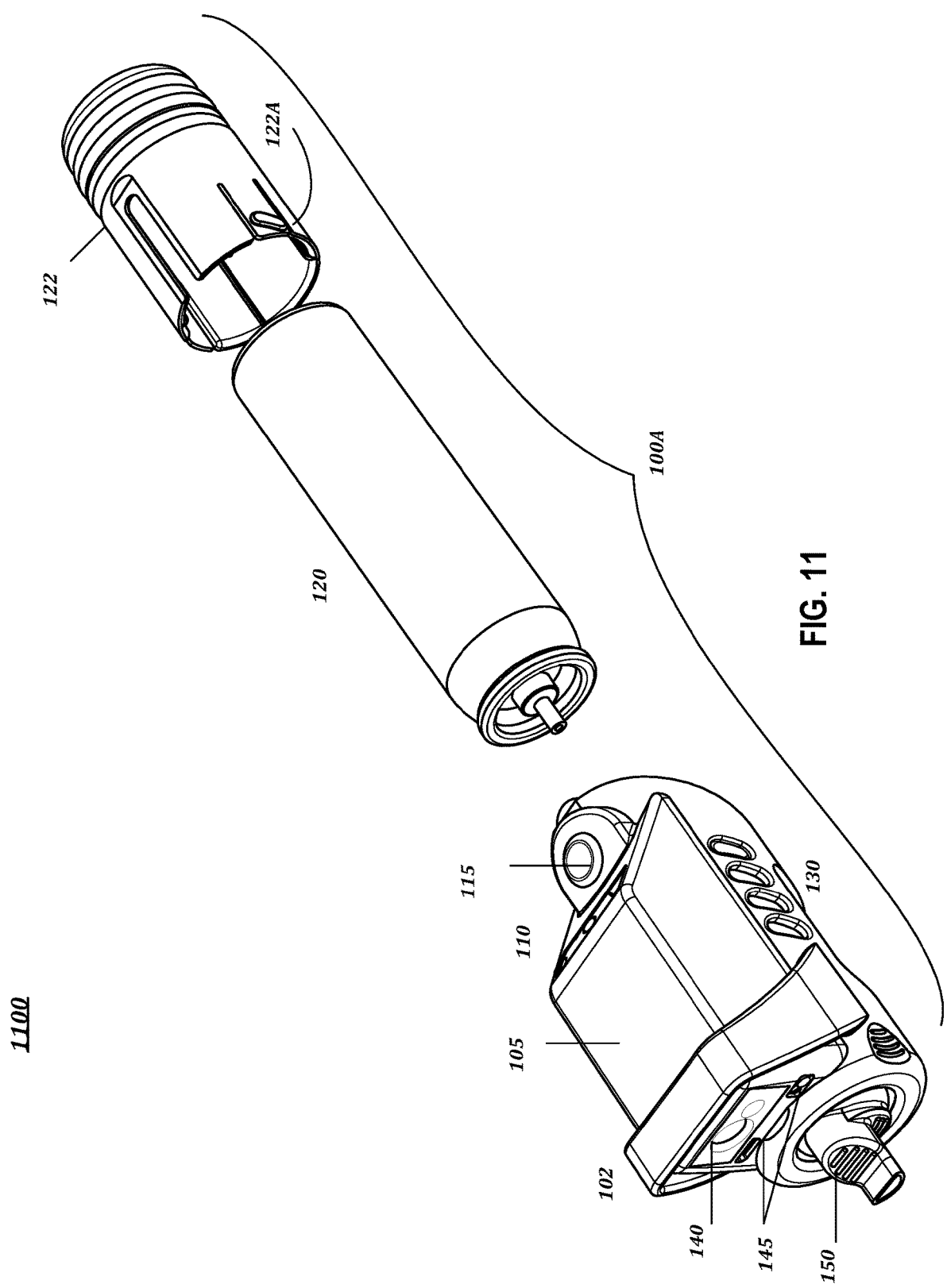
FIG. 11 shows an exploded view of the full assembly of the precision real-time laser measurement and marking apparatus in accordance with an embodiment of the present disclosure.

FIG. 11 shows an exploded view of the full assembly of the precision real-time laser measurement and marking apparatus in accordance with an embodiment of the present disclosure. More specifically, FIG. 11, 1100 shows a top front left exploded view of the precision real-time laser measurement and marking apparatus 100A which shows the top side of the precision real-time laser measurement and marking apparatus 100A. FIG. 11, 1100 shows a can cover 122 configured to cover a base of the foam spray can 120. FIG. 11, 1100 shows some of the multiple components of the full assembly precision real-time laser measurement and marking apparatus as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165.

Figure 12:
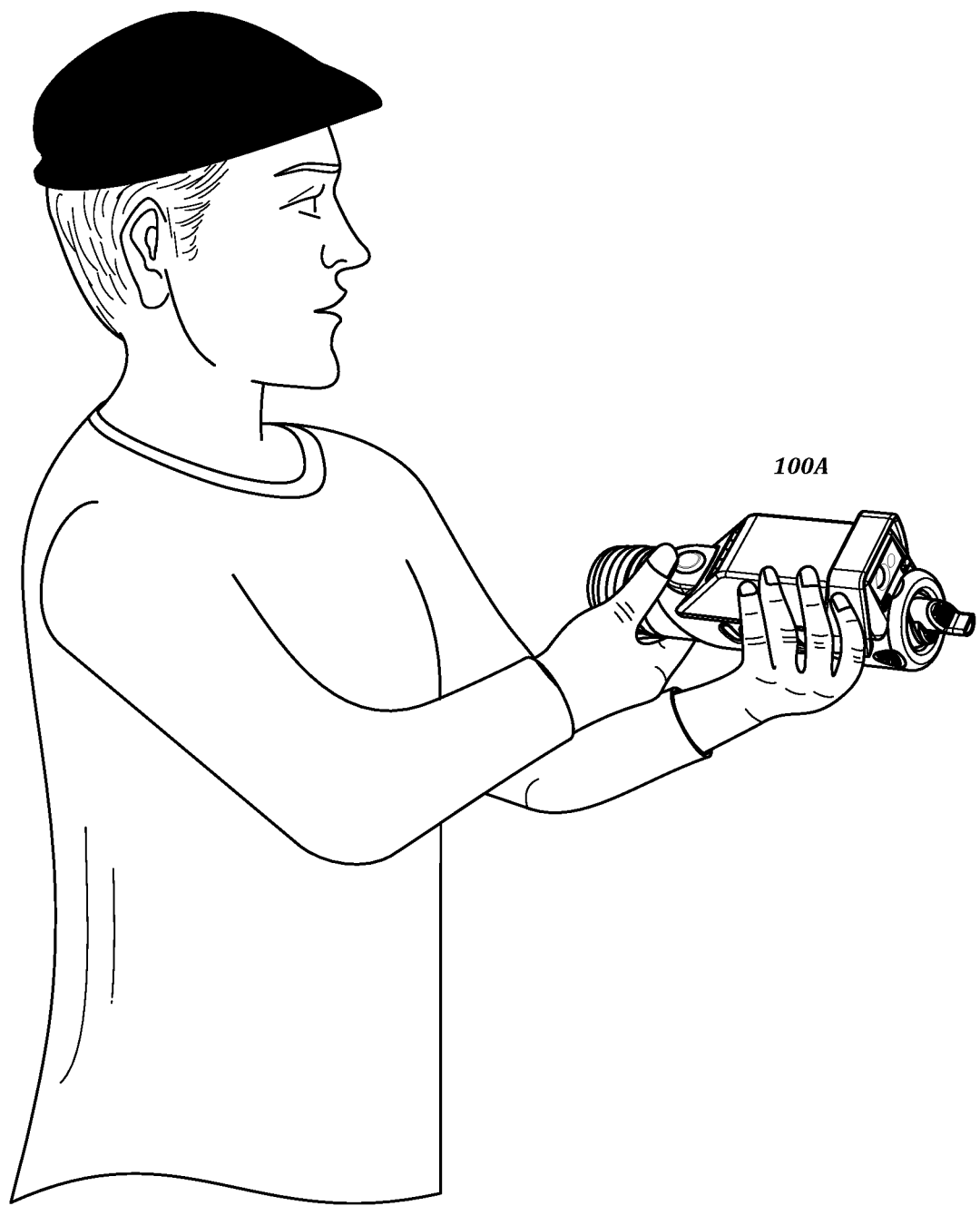
FIG. 12 shows a view of the precision real-time laser measurement and marking apparatus in an operating environment in accordance with an embodiment of the present disclosure.

FIG. 12 shows a view of the precision real-time laser measurement and marking apparatus in an operating environment in accordance with an embodiment of the present disclosure. FIG. 12, 1200 shows the multiple components of the full assembly precision real-time laser measurement and marking apparatus 100A is use in an operating environment. Some of the multiple components of the full assembly precision real-time laser measurement and marking apparatus 100A are as follows: a main housing 105, a foam spray can 120, a spray nozzle button 150, a spray nozzle aperture 155, clip mounting peg 170, clip assembly, range reading button 115, a laser range finder 140, a display 110, a spray can bracket 125, a side venting grip 130, housing squeeze points 135, a mini USB port 145B, a power switch 145A, and a bottom surface of the main housing 165. FIG. 12, 1200 shows a user, possibly a gaming official pressing range reading button 115 while aiming the precision real-time laser measurement and marking apparatus 100A in the direction of a spot on a playing field.

The precision real-time laser measurement and marking apparatus 100A and the components may be manufactured using injection molded plastics included but not limited to Acrylonitrile Butadiene Styrene (ABS), polycarbonate alloy (PC), or PC in combination with ABS to provide additional robustness. Colors may vary according to preference however the precision real-time laser measurement and marking apparatus 100A may be customized to match tournament colors, team colors, officials' uniforms, and the like.

In one or more embodiments, the precision real-time laser measurement and marking apparatus 100A comprises a computer or one or more electrical components. The one or more electrical components of precision real-time laser measurement and marking apparatus 100A may comprise a laser measuring module configured to interface with at least one controller secondary configured to allow a laser measuring module to measure the distance. The at least one controller further configured to perform comprehensive tasks including but not limited to time tracking, data logging, receiving user input, transmitting and receiving data, use of various communication media including wired networks, BLUETOOTH® technology, WIFI® networks, wireless networks, telecommunication networks, and other network communication means, satellite communication and radio. The at least one controller further configured such that it can be updated and enhanced for future devices to have additional functions. A mini USB port 145B and a power switch 145A configured to function as a permanent power on/off switch are found on the precision real-time laser measurement and marking apparatus 100A. The measuring function may be activated by pressing a thumb activated range reading button 115 below the display 110 wherein the display 110 may be configured as a seven segment Liquid Crystal Display (LCD) readout. The precision real-time laser measurement and marking apparatus 100A may be configured to function in full daylight as well as shade and a mixture of both. In one or more embodiments, the precision real-time laser measurement and marking apparatus 100A may function in a night time stadium game with appropriate lighting.

ADVANTAGES AND BENEFITS

In contemporary football or soccer gameplay, currently, a soccer referee may walk out an approximated ten-yard distance for placement of a free kick. However, in actuality, the referee never exactly marks off ten-yards. This can change the outcome of a game instantly by unfairly providing an advantage to one opponent over another. Accurate placement of free kicks in today's modern game been a specialty tactic and represents fifty percent outcomes of high-level matches. Research and statistics show referees are more likely to be less than ten-yards at least fifty percent of the time. The rules of football read "Until the ball is in play all opponents must remain: at least 9.15 m (10 yds) from the ball, unless they are on their own goal line between the goalposts outside the penalty area for free kicks inside the opponents' penalty area."[1] Based on the research, when the official placed a free kick from a distance of twenty-five plus yards or more from the goal, the average walked out distance was between nine and ten yards. Furthermore, when the official placed a free kick from a distance between twenty to twenty-five yards (just outside the penalty box and directly in front of goal), the average walked out distance was between eight to ten yards where defenders in the wall are lined up in the penalty box. Moreover, when the official placed a free kick from a distance between twenty to twenty-five yards outside the penalty box and at an angle (i.e. corner of penalty box either left or right side), the average walked out distance was between seven to ten yards.

[1] http://www.theifab.com/laws/free-kicks-2018/chapters/procedure-2018

When vanishing spray is not used by the officials, the defenders in the wall, breach the final standing (do not move position) by one to twelve inches, ninety percent of the time. When spray is not used, the ball is either repositioned in any direction by the free kick taker and mostly moved sideways or forward by one to thirty-six inches ninety percent of the time.

The present disclosure offers numerous advantages and solutions to the aforementioned problems. For example, in bad weather where visibility seeing the ball is compromised or wind affects position of the ball, the apparatus can accurately measure exact distances. This increases the accuracy and precision of the free kicks.

There is an improved simplicity of use in addition to a lack of inconvenience for the official. For example, the addition of the laser measuring device on the can, which the referee already carries, does not change the weight of can by more than one ounce. The apparatus may be powered by a small lithium battery.

There is added advantage of using the apparatus. For example, the difference between the existing spray can that's currently used, and the apparatus is the existing version only has one use. To spray the grass where the referee has walked out 10 yards. The current apparatus measures the exact distance to within 0.005% accuracy.

Furthermore, the apparatus provides legitimacy to the distances marked by gaming officials. For example, in the world of competing football where more and more players are competing from hundreds of countries worldwide the laser can is the only product that legitimizes exact distances. Forty-eight teams will qualify for World Cup 2020. The stakes are huge. The current system and apparatus can level the playing field.

Methods for Using the Devices and Systems

The present disclosure, according to further aspects, also provides methods of using the disclosed devices and systems. In one aspect, disclosed herein is a method for using the precision real-time laser measurement and marking apparatus.

Figure 13:
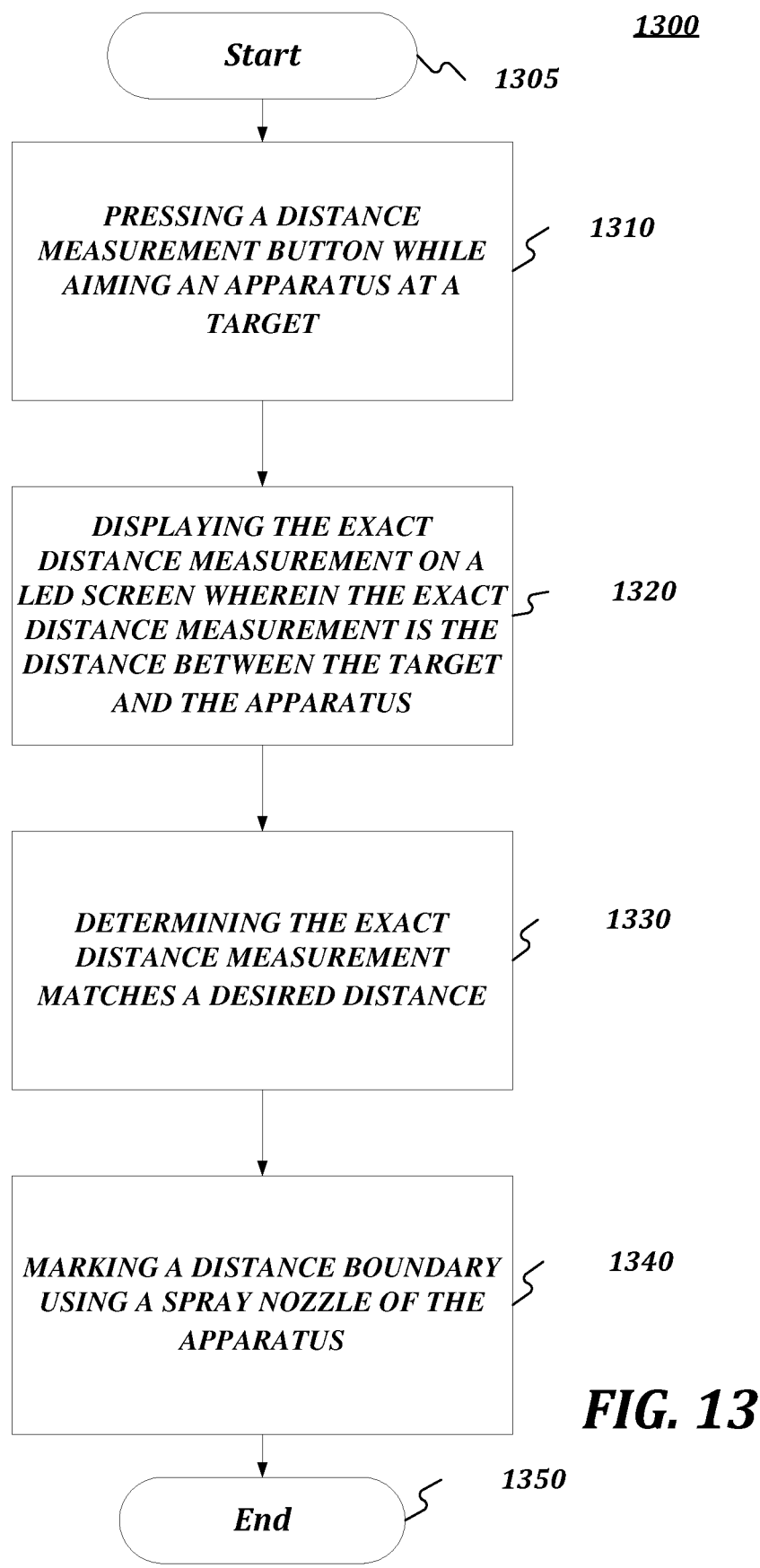
FIG. 13 is a flow chart of a method for using the precision real-time laser measurement and marking apparatus in accordance with an embodiment of the present disclosure.

FIG. 13 is a flow chart of a method for using the precision real-time laser measurement and marking apparatus in accordance with an embodiment of the present disclosure. FIG. 13 is a flow chart setting forth the general stages involved in a method 1300 consistent with an embodiment of the disclosure for providing the Precision real-time laser measurement and marking apparatus in accordance with an embodiment of the present disclosure. Although method 1300 has been described to be performed by a first user, it should be understood that any number of users may be used to perform the various stages of method 1300. Furthermore, in some embodiments, different operations may be performed by different users in operative communication with a first user.

Scenarios of Use

The precision real-time laser measurement and marking apparatus may be used in one or more various scenarios in accordance with one or more embodiments of the present disclosure. For example, the precision real-time laser measurement and marking apparatus may be used

- After blowing whistle to stop play due to a foul, the game official (i.e. referee) must position the football (i.e. soccer ball, or game ball) where the foul was committed.
- The game ball remains in its stationary position of placement as the referee walks out 10-yards and then points the precision real-time laser measurement and marking apparatus at the game ball.

Upon pressing a trigger, a laser from the precision real-time laser measurement and marking apparatus may be used to shine a sharp red laser marker on the stationary game ball. A display from the precision real-time laser measurement and marking apparatus may provide a display reading (including but not limited to a backlit display panel, an LED (light emitting diode) digital numerical display read out, or other visual display) on the precision real-time laser measurement and marking apparatus which provides the exact distance between the precision real-time laser measurement and marking apparatus and the game ball.

Accurate data measurement provided in real-time allows a game official to reposition until the moment when the official moves to exactly the position where 10-yards is measured on the LED read out. In one or more embodiments, a second laser marker on the bottom of the precision real-time laser measurement and marking apparatus may be used (at 90 degrees) to shine directly on the pitch between the referee's feet which may establish an exact 10-yard end position.

The official may squeeze the spray nozzle of the precision real-time laser measurement and marking apparatus which may be used to release marking spray from the bottom of the precision real-time laser measurement and marking apparatus along the line of the laser and forms a visible line on the playing field. This line marks the 10-yard position where the defenders on the playing field must stand behind.

A method for using the precision real-time laser measurement and marking apparatus:

A. pressing a distance measurement button while aiming an apparatus at a target;

B. displaying an exact distance measurement on a LED screen wherein the exact distance measurement is the distance between the target and the apparatus;

C. determining the exact distance measurement matches a desired distance; and

D. marking a distance boundary using a spray nozzle of the apparatus.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1300 will be described in greater detail below.

Method 1300 may begin at starting block 1305 and proceed to stage 1310 where a user may press a distance measurement button while aiming an apparatus at a target. For example, a football referee may press the apparatus while aiming a football on a sporting field when measuring a free kick placement.

From stage 1310, where a user presses a distance measurement button while aiming an apparatus at a target, method 1300 may advance to stage 1320 where the apparatus displays an exact distance measurement on a LED screen wherein the exact distance measurement is the distance between the target and the apparatus. For example, a football referee may read a "10 yards" measurement on the display screen of the apparatus while measuring a free kick placement.

Once the apparatus displays an exact distance measurement on a LED screen wherein the exact distance measurement is the distance between the target and the apparatus in stage 1320, method 1300 may continue to stage 1330 where a user determines whether the exact distance measurement matches a desired distance. For example, a football referee may determine whether the displayed measurement on the display screen of the apparatus matches the required distance such as ten yards for a free kick placement.

After a user determines whether the exact distance measurement matches a desired distance in stage 1330, method 1300 may proceed to stage 1340 where a user marks a distance boundary using a spray nozzle of the apparatus. For example, a football referee may press the spray nozzle of the apparatus on a sporting field when measuring a free kick placement in stage 1340, method 1300 may then end at stage 1350.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Figure 15:
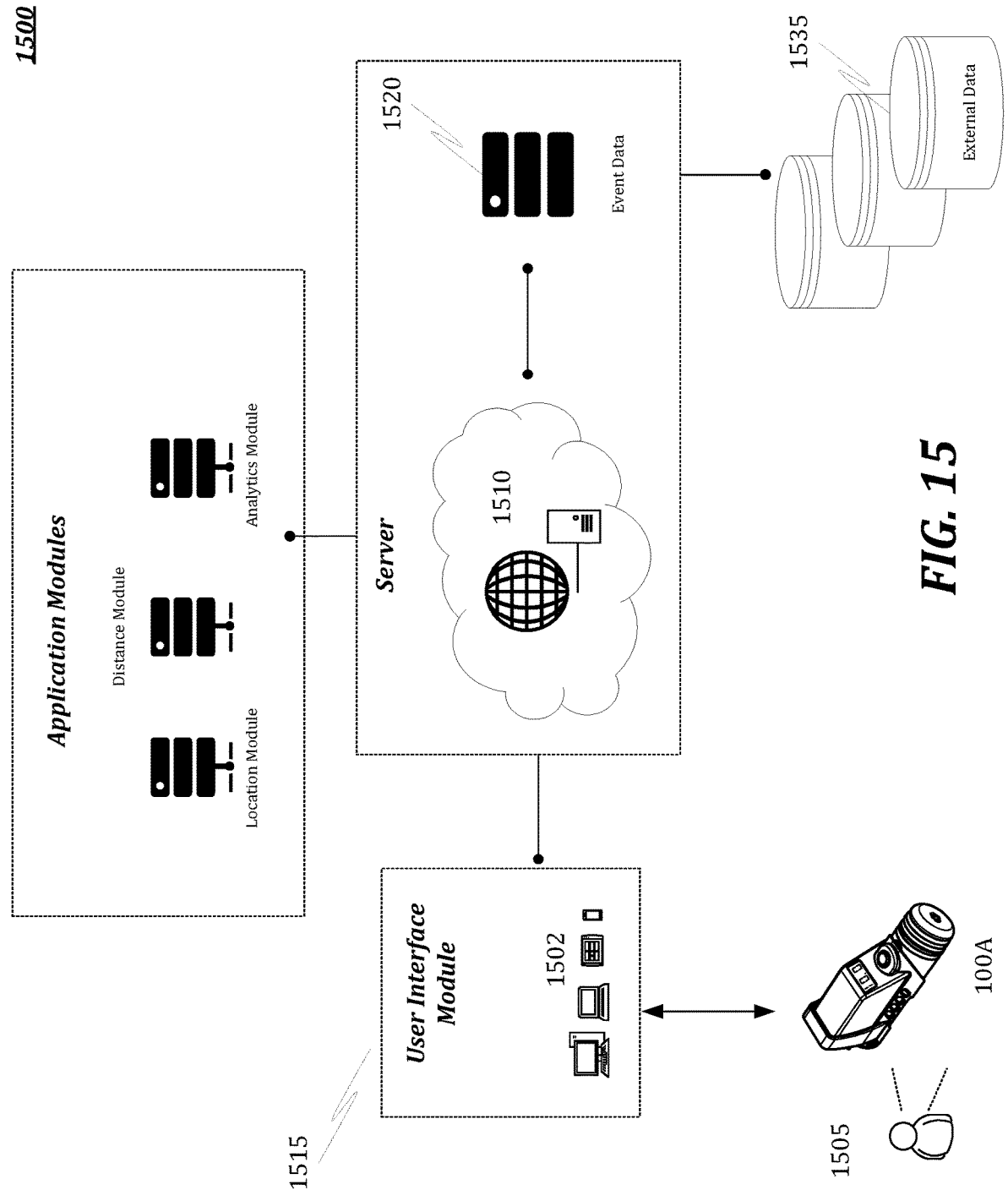
FIG. 15 shows the operating environment for the precision real-time laser measurement and marking apparatus in accordance with an embodiment of the present disclosure.

FIG. 15 illustrates a block diagram of an operating environment consistent with the present disclosure. FIG. 15 illustrates one possible operating environment through which a platform consistent with embodiments of the present disclosure may be provided. By way of non-limiting example, FIG. 15 shows the operating environment for the precision real-time laser measurement and marking apparatus in accordance with an embodiment of the present disclosure. The precision real-time laser measurement and marking apparatus may further comprise GPS and other chip technologies are also embedded in the apparatus. Moreover, the disclosed precision real-time laser measurement and marking apparatus may be configured to record product usage and other metrics is available via USB to an IBLC™ software platform. The software platform may be configured such that referees will be able to upload analytical data recorded during a game to IBLC™ software and various third-party organizations and referee associations. The information gathered on every usage will be used in a long-term study.

With regards to FIG. 15, a user 1505 utilizes the precision real-time laser measurement and marking apparatus which is operatively coupled to a user interface module 1515. The user interface module 1515 may be implemented by one or more computing devices 1502 wherein the one or more computing devices may be a smartphone, tablet, personal computer, laptop computer, or a computing device 1400. The precision real-time laser measurement and marking apparatus may be connected to a number of application modules 1525 (i.e. Location Module, Distance Module, and Analytics Module); a server 1510. The server storing information at an event data storage location 1520. Additional information may be stored in another location with external data 1535.

The platform 1500 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 1500 may be hosted on a centralized server, such as, for example, a cloud computing service. Although method 1300 has been described to be performed by a computing device 1400, it should be understood that, in some embodiments, different operations may be performed by different networked elements in operative communication with computing device 1400.

Embodiments of the present disclosure may comprise a system having a memory storage and a processing unit. The processing unit coupled to the memory storage, wherein the processing unit is configured to perform the stages of method 1300.

Figure 14:
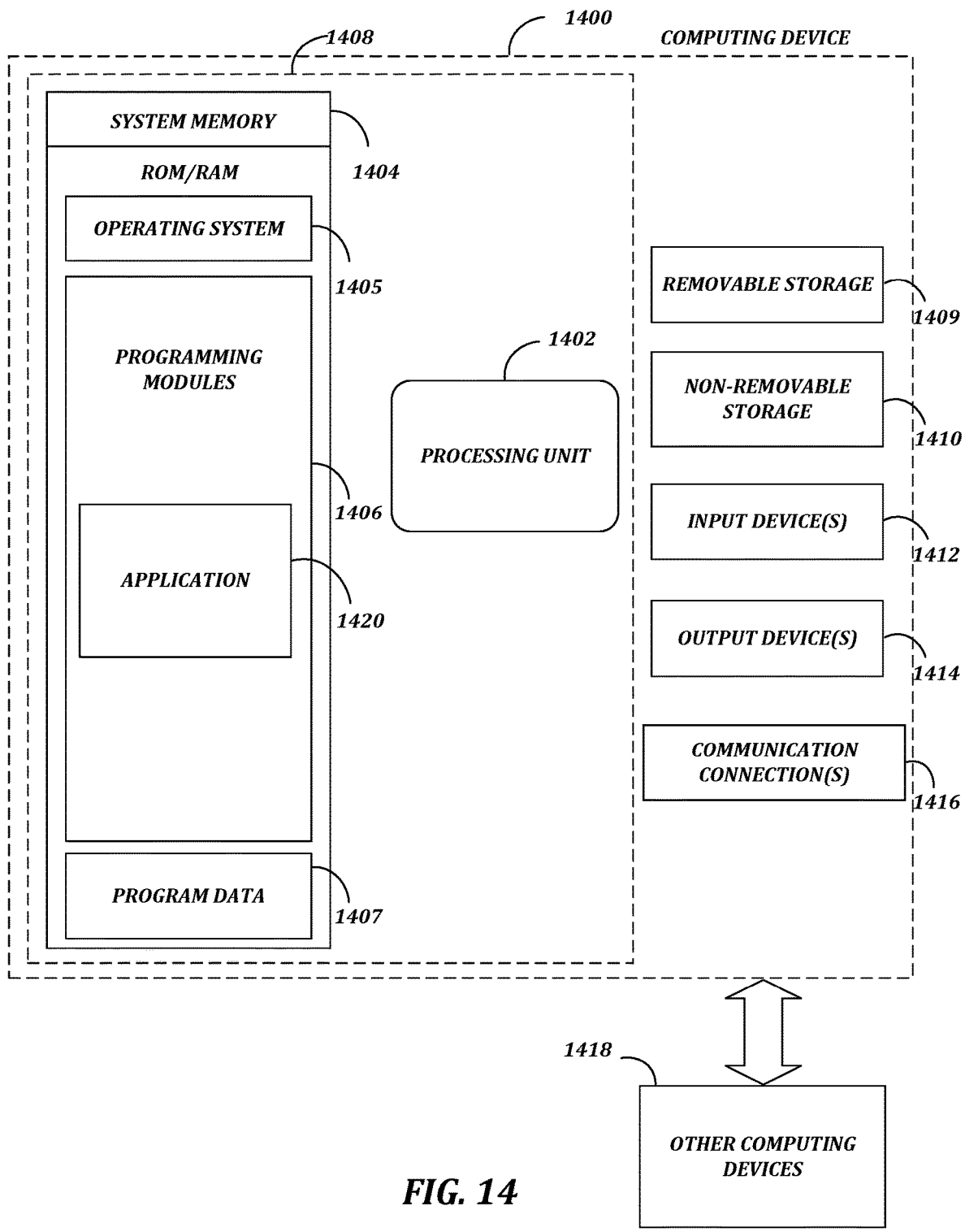
FIG. 14 is a block diagram of a system including a computing device for performing the method of FIG. 13.

FIG. 14 is a block diagram of a system including a computing device 1400 for performing the method of FIG. 13.

Consistent with an embodiment of the disclosure, the aforementioned memory storage and processing unit may be implemented in a computing device, such as computing device 1400 of FIG. 14. Any suitable combination of hardware, software, or firmware may be used to implement the memory storage and processing unit. For example, the memory storage and processing unit may be implemented with computing device 1400 or any of other computing devices 1418, in combination with computing device 1400. The aforementioned system, device, and processors are examples and other systems, devices, and processors may comprise the aforementioned memory storage and processing unit, consistent with embodiments of the disclosure.

With reference to FIG. 14, a system consistent with an embodiment of the disclosure may include a computing device, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include a user interface module, a location module, an analytics module, and additional programming modules that could enable the disclosure, for example application modules 1420. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and nonvolatile, removable and non-removable media implemented in any method or technology for storage of information, such as computer readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1404, including operating system 1405. While executing on processing unit 1402, programming modules 1406 (e.g., a user interface module, a location module, an analytics module, and additional programming modules that could enable the disclosure, for example application modules 1420) may perform processes including, for example, one or more of method 1300's stages as described above. The aforementioned process is an example, and processing unit 1402 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

CLAIMS

While the specification includes examples, the disclosure's scope is indicated by the following claims. Furthermore, while the specification has been described in language specific to structural features and/or methodological acts, the claims are not limited to the features or acts described above.

Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A portable marking device comprising:
   a housing including a main housing structure and a can cover,
   the main housing structure having a front open end, a rear nozzle end, a top surface, a bottom surface, and a pair of opposing side walls each side wall including a plurality of side venting grips disposed thereon,
   the can cover having a rear open end, a front closed end, at least one portion of the car cover extending at the rear open end to selectively engage with an aperture of at least one corresponding side venting grip from the plurality of side venting grips to couple the main housing structure and the can cover;
   a nozzle member positioned at the rear nozzle end of the of the main housing structure the nozzle member having a spray aperture and a spray nozzle button configured to dispense a marking material from within the spray can through the spray aperture;
   an optical measuring apparatus contained within the main housing structure for real-time measuring of a distance between a point of focus and the portable marking device; and a housing guard disposed over the optical measuring apparatus;
   the spray can containing the marking material therein, the spray can having an upper spray end, an intermediate section and a lower base end, the upper spray end and a first portion of the intermediate section configured to be removably inserted through the front open end of the main housing structure until the upper spray end cooperatively engages the nozzle member; and wherein the can cover is configured to cover the lower base end and a second remaining portion of the intermediate section of the spray can for releasably securing the spray can within the housing when the can cover and main housing structure are coupled using the at least one portion of the can cover extending at the rear open end selectively engages with the aperture of at least one corresponding side venting grip of the plurality of side venting grips.

2. The portable marking device of claim 1, further comprising a range measurement button disposed on the top surface of the main housing structure for activating real-time measuring by the optical measuring apparatus, and a measurement display screen positioned on a front face of the main housing structure above the range measurement button; and wherein the optical measuring apparatus comprises a range finder disposed on a surface at the rear nozzle end above the nozzle member.

3. The portable marking device of claim 2, wherein the portable marking device is configured to perform real-time measuring when a user aims the range finder at the point of focus and activates the optical measuring apparatus to obtain a real-time measurement of distance; and wherein the portable marking device is further configured to display the real-time measurement on the measurement display screen.

4. The portable marking device of claim 3, further comprising a clip mounting peg disposed on the bottom surface of the main housing structure for attaching a universal clip member.

5. The portable marking device of claim 3, wherein the portable marking device further comprises a universal serial bus port (USB) port and a controller configured to interface with the optical measuring apparatus.

6. The portable marking device of claim 5, wherein the controller is further configured to perform time tracking, perform data logging, receive user input, and transmit and receive data.

7. The portable marking device of claim 6, further comprising a squeeze surface points disposed on each side wall at the rear nozzle end and spaced from the plurality of side venting grips; wherein the squeeze surface points are configured to allow a user to securely hold the housing in one hand and allow replacement of the spray can with the other hand.

8. The portable marking device of claim 4, wherein the universal clip member is configured to attach to one or more item selected from the group consisting of garments, pockets, belt loops, bags, purses, belts, and belt straps.

9. The portable marking device of claim 7, wherein the housing guard comprises a U-shaped member configured as a handle for grasping the portable marking device.

10. The portable marking device of claim 9, wherein the housing is manufactured from injected molded plastic selected from the group consisting of acrylonitrile butadiene styrene (ABS), polycarbonate alloy (PC), and a combination thereof.

11. The portable marking device of claim 9, wherein the housing guard is a U-shaped member connected to the side walls between the squeeze surface point and the plurality of side venting grips.

12. The portable marking device of claim 11 further comprising a memory, a computing device, a transmitter, and a receiver.

13. The portable marking device of claim 11, wherein the closed front end of the can cover comprises an opening with a bracket element contained therein configured for attachment of a string, a cord, a necklace, a key chain, or a combination thereof.

14. The portable marking device of claim 13, further comprising a string, a cord, a necklace, or a key chain attached to the bracket element.

15. The portable marking device of claim 11, wherein the portable marking device is configured to transmit a first laser on the point of focus for obtaining a real-time measurement of the distance to the point of focus.

16. The portable marking device of claim 15, wherein the real-time measurement of the distance is within 0.005% accuracy.

17. A method for using a marking device, wherein said marking device comprising: a housing including a main housing structure and a can cover, the main housing structure having a front open end, a rear nozzle end, a top surface, a bottom surface, and a pair of opposing side walls each side wall including a plurality of side venting grips disposed thereon, the can cover having a rear open end, a front closed end, at least one portion of the can cover extending at the rear open end to selectively engage with an aperture of at least one corresponding side venting grip from the plurality of side venting grips to couple the main housing structure and the can cover; a nozzle member positioned at the rear nozzle end of the of the main housing structure, the nozzle member having a spray aperture and a spray nozzle button configured to dispense a marking material from within the spray can through the spray opening; an optical measuring apparatus contained within the main housing structure for real-time measuring of a distance between a point of focus and the portable marking device; and a housing guard disposed over the optical measuring apparatus; the spray can containing the marking material therein, the spray can having an upper spray end, an intermediate section and a lower base end, the upper spray end and a first portion of the intermediate section configured to be removably inserted through the front open end of the main housing structure until the upper spray end cooperatively engages the nozzle member; and wherein the can cover is configured to cover the lower base end and a second remaining portion of the intermediate section of the spray can for releasably securing the spray can within the housing when the can cover and main housing structure are coupled using the at least one portion of the can cover extending at the rear open end to selectively engage with the aperture of at least one corresponding side venting grip of the plurality of side venting grips; said method comprising:

pressing a distance measurement button while aiming the marking device at a target;

displaying an exact distance measurement on a display of the marking device wherein the exact distance measurement is a distance between the target and the marking device:

determining the exact distance measurement matches a desired distance; and marking a distance boundary using the spray nozzle aperture of the marking device.

18. The method of claim 17 further comprising:

receiving user information;

storing measurement data gathered from the determination step; and sending at least one of measurement data and user information.

\* \* \* \* \*